(12) United States Patent
Depner et al.

(10) Patent No.: US 12,722,906 B2
(45) Date of Patent: Sep. 1, 2026

(54) CONTAINER DISCHARGE APPARATUS FOR DISCHARGING CONTAINERS FROM A MASS-FLOW CONVEYOR AND FOR SEPARATING THE CONTAINERS, AND METHOD FOR OPERATING THE CONTAINER DISCHARGE APPARATUS

(71) Applicant: KRONES AG, Neutraubling (DE)

(72) Inventors: Christian Depner, Silberstedt (DE); Jens Luecke, Flensburg (DE); Niels Clausen, Dollerup (DE)

(73) Assignee: KRONES AG, Neutraubling (DE)

( * ) Notice: Subject to any disclaimer, the term of this patent is extended or adjusted under 35 U.S.C. 154(b) by 158 days.

(21) Appl. No.: 18/710,117

(22) PCT Filed: Nov. 21, 2022

(86) PCT No.: PCT/EP2022/082594
§ 371 (c)(1),
(2) Date: May 14, 2024

(87) PCT Pub. No.: WO2023/089168
PCT Pub. Date: May 25, 2023

(65) Prior Publication Data

US 2025/0011103 A1 Jan. 9, 2025

(30) Foreign Application Priority Data

Nov. 22, 2021 (DE) ..................... 10 2021 130 487.3

(51) Int. Cl.
*B65G 47/68* (2006.01)
*B65G 47/14* (2006.01)
(Continued)

(52) U.S. Cl.
CPC ......... *B65G 47/1492* (2013.01); *B65G 47/46* (2013.01); *B65G 47/682* (2013.01)

(58) Field of Classification Search
CPC .. B65G 47/1492; B65G 47/46; B65G 47/682; B65G 47/68; B65G 47/71; B65G 2201/0244
(Continued)

(56) References Cited

U.S. PATENT DOCUMENTS 3,104,753 A * 9/1963 Osbourne ............ B65G 47/684 198/447
4,401,207 A * 8/1983 Garvey ................ B65G 47/684 198/453
(Continued)

FOREIGN PATENT DOCUMENTS

DE 3418736 A1 11/1985
DE 3715577 A1 11/1988
(Continued)

OTHER PUBLICATIONS

US 2006/0086591 A1, Gust et al., (Apr. 27, 2006).*
(Continued)

*Primary Examiner* — Douglas A Hess
(74) *Attorney, Agent, or Firm* — McCoy Russell LLP

(57) ABSTRACT

A container discharge apparatus for discharging containers from a mass flow conveyor and for separating the containers, the apparatus comprising the following: adjoining a mass flow conveyor, a first group of a plurality of first conveyors arranged in parallel which can be driven in a first direction transverse to the transport direction of the mass flow conveyor and are designed to separate containers and to convey them in the first direction; adjoining the first group so as to be parallel therewith, a second group of a plurality of second conveyors arranged in parallel which can be driven in a second direction and are designed to convey the separated conveyors in the second direction opposite the first direction; one or more third conveyors, the third conveyor(s) being designed to transport away the separated containers.
(Continued)

The invention also relates to a method for operating the container discharge apparatus.

20 Claims, 19 Drawing Sheets

(51) Int. Cl.
*B65G 47/46* (2006.01)
*B65G 47/71* (2006.01)

(58) Field of Classification Search
USPC ............................................ 198/452, 457.05
See application file for complete search history.

(56) References Cited

U.S. PATENT DOCUMENTS 5,228,550 A * 7/1993 Munch ................. B65G 47/715
198/452
5,760,343 A * 6/1998 Arimoto ................ G01G 19/42
198/452
6,575,287 B2 * 6/2003 Garvey ................ B65G 47/684
198/452
6,612,417 B2 * 9/2003 Garvey ................ B65G 47/684
198/607
7,198,147 B2 * 4/2007 Petrovic ............... B65G 47/682
198/452
7,322,459 B2 * 1/2008 Garvey ................ B65G 47/684
198/623
8,220,615 B2 * 7/2012 Petrovic ............... B65G 47/682
198/452
9,714,144 B2 * 7/2017 Earling .............. B65G 47/5145
12,344,486 B2 * 7/2025 Depner .................... A23B 2/22

FOREIGN PATENT DOCUMENTS

FR 2838412 A1 10/2003
GB 623482 A 5/1949
WO 2009065409 A1 5/2009

OTHER PUBLICATIONS

ISA European Patent Office, International Search Report Issued in Application No. PCT/EP2022/082594, Mar. 16, 2023, WIPO, 4 pages.

* cited by examiner 91
92
93
94
97
98
99
100
103
104
105
107
108
95
3
2
101
109
112
113
89
90
96
102
111
115
110
116
114
106

2
3
121
122
123
124
125
126
128
129
130
131
132
133
134
135
136
137
138
139
140
141
142
143
144
145
146
147
148
149
150

155
156
157
158
159
171
160
172
3
2
175
174
173
177
154
162
163
164
165
166
167
168
161
169
176
180
179
178
170

2
171
156
157
158
159
162
163
173
164
165
166
179
167
168
176
170

CONTAINER DISCHARGE APPARATUS FOR DISCHARGING CONTAINERS FROM A MASS-FLOW CONVEYOR AND FOR SEPARATING THE CONTAINERS, AND METHOD FOR OPERATING THE CONTAINER DISCHARGE APPARATUS

CROSS REFERENCE TO RELATED APPLICATIONS

The present application is a U.S. National Phase of International Application No. PCT/EP2022/082594 entitled "CONTAINER DISCHARGE APPARATUS FOR DISCHARGING CONTAINERS FROM A MASS-FLOW CONVEYOR AND FOR SEPARATING THE CONTAINERS, AND METHOD FOR OPERATING THE CONTAINER DISCHARGE APPARATUS," and filed on Nov. 21, 2022. International Application No. PCT/EP2022/082594 claims priority to German Patent Application No. 10 2021 130 487.3 filed on Nov. 22, 2021. The entire contents of each of the above-listed applications are hereby incorporated by reference for all purposes.

TECHNICAL FIELD

The present invention relates to a container discharge apparatus for discharging containers from a mass flow conveyor and for separating the containers according to claim 1, and to a method for operating the container discharge apparatus according to claim 14.

BACKGROUND AND SUMMARY

DE 37 15 577 A1 discloses a device for carrying out a method for transferring upright bottles arriving in rows side by side into a single row of bottles, having an infeed conveyor for the bottles arriving in rows side by side, a discharge conveyor for the single row of bottles, and an intermediate conveyor which is arranged downstream between the infeed conveyor and the discharge conveyor and which has parallel conveyor portions which lie side by side and are driven at different speeds and which are inclined as a whole to the side of the discharge conveyor in a manner enabling the bottles to be driven down a slope, characterized in that the conveying portions adjacent to the infeed conveyor have a first conveying direction which is opposite to a second conveying direction of the conveying portions adjacent to the discharge conveyor.

Such devices can demand a high space requirement in a system, and forces acting upon the containers can be large.

Object

Starting from the known prior art, the technical object to be achieved is to specify a container discharge apparatus for discharging containers from a mass flow conveyor and for separating the containers, and a method for operating the container discharge apparatus, which can be operated in a space-saving manner and in which the forces acting upon the containers can be reduced.

Achievement

This object is achieved according to the invention by a container discharge apparatus for discharging containers from a mass flow conveyor and for separating the containers according to claim 1, and by a method for operating the container discharge apparatus according to claim 14. Further embodiments and developments are described in the dependent claims.

The container discharge apparatus according to the invention for discharging containers from a mass flow conveyor and for separating the containers comprises, downstream of a mass flow conveyor, a first group of a plurality of first conveyors arranged in parallel, which can be driven in a first direction transverse to a transport direction of the mass flow conveyor and are designed to separate containers and convey them in the first direction. Further, the container discharge apparatus comprises, following in parallel the first group of a plurality of first conveyors arranged in parallel, a second group of a plurality of second conveyors arranged in parallel, which can be driven in a second direction and are designed to convey the separated containers in the second direction, which is opposite to the first direction, and one or more third conveyors, wherein the third conveyor or conveyors is/are designed to transport away the separated containers.

By providing conveyors arranged in parallel which are arranged transversely to a mass flow conveyor and which are also used to separate the containers, a compact design and thus a savings of space can be achieved.

A container treatment device such as a pasteurizer, heater, cooler, or container cleaning device can also be assigned to the mass flow conveyor. Furthermore, the mass flow conveyor can have a buffering effect on the container flow.

At the end of the plurality of first conveyors arranged in parallel and at the beginning of at least some of the plurality of second conveyors arranged in parallel, a concave railing can be provided above the transport surfaces. For example, the concave railing can comprise a curve that describes an angle that lies in a range of 135° to 195°.

The provision of the concave railing makes it possible for containers to be diverted gently and efficiently from the first conveyors to the second conveyors.

Above the transport surfaces, between the first group and the second group, a straight railing can be provided which can be designed in such a way that there can be a transition region for containers between the first group and the second group.

The transition region can be divided into a first partial transition region and a second partial transition region by a further concave railing. For example, the further concave railing can be arranged partially above at least some of the plurality of first conveyors arranged in parallel and at least some of the plurality of second conveyors arranged in parallel. For example, the further concave railing can also be triangularly tapered on the surface opposite the concave surface.

By providing the further concave railing, the diverting of containers from the first conveyors to the second conveyors can be realized even more gently and efficiently.

A further railing can be provided above the transport surfaces of the plurality of second conveyors arranged in parallel. For example, the further railing can leave the transition region free. For example, the straight railing can merge into the further railing. For example, the further railing can be straight or can have steps.

The containers can be guided onto the second conveyors by the further railing.

The plurality of first conveyors arranged in parallel can each comprise transport surfaces which can be arranged without steps in adjacent regions, wherein the individual transport surfaces can enclose angles of 0° to −30°, inclusive, with a plane perpendicular to the direction of action of gravity.

In this way, a downward slope force away from the mass flow conveyor can act upon the containers due to the inclination of the transport surfaces of the first conveyors.

The plurality of second conveyors arranged in parallel can each comprise transport surfaces which can be arranged without steps in adjacent regions, wherein the individual transport surfaces can enclose angles of 0° to −30°, inclusive, with a plane perpendicular to the direction of action of gravity.

In this way, a downward slope force away from the mass flow conveyor and away from the first conveyors can act upon the containers due to the inclination of the transport surfaces of the second conveyors.

The plurality of second conveyors arranged in parallel can each comprise transport surfaces which can be arranged without steps in adjacent regions, wherein the individual transport surfaces can enclose angles of 0° to +30°, inclusive, with a plane perpendicular to the direction of action of gravity.

In this way, a downward slope force towards the first conveyors can act upon the containers due to the inclination of the transport surfaces of the second conveyors.

A first number of the plurality of second conveyors arranged in parallel can each comprise first transport surfaces which can be arranged without steps in adjacent regions, wherein the individual first transport surfaces can enclose angles of 0° to −30°, inclusive, with a plane perpendicular to the direction of action of gravity. A second number of the plurality of second conveyors arranged in parallel can each comprise second transport surfaces which can be arranged without steps in adjacent regions, wherein the individual second transport surfaces can enclose angles of 0° to +30°, inclusive, with a plane perpendicular to the direction of action of gravity. For example, at least one of the plurality of second conveyors arranged in parallel can be provided with its transport surface between the first number and the second number of the plurality of second conveyors arranged in parallel, and its transport surface can enclose an angle of 0° with a plane perpendicular to the direction of action of gravity.

The larger angles can increase the downward slope force and thus the effect on the containers.

Alternatively or in addition to the angles mentioned above or further below that the individual transport surfaces can enclose with a plane perpendicular to the direction of gravity, the transport surfaces of the conveyors mentioned above or further below—individual conveyors, two or more adjacent conveyors, or groups of conveyors—can have a course twisted into itself. An angle to a plane perpendicular to the direction of gravity can change over the length and/or width of the individual conveyor, the two or more adjoining conveyors, or the group of conveyors. As a result, the transitions at locations with a larger or smaller angle can take place more gently. There is no bend in the transport plane, wherein the transport plane can include a plurality of conveyor surfaces; rather, the transitions to other angles, e.g., from adjacent transport surfaces, can be formed without steps and/or without irregularities. The transition to other angles can be made seamless.

The container discharge apparatus can comprise at least one ejection device for containers. For example, it can comprise at least one flexible element and at least one collecting device for ejected containers, wherein the at least one flexible element can be provided at a distance above at least some of the plurality of first conveyors arranged in parallel and/or above at least some of the plurality of second conveyors arranged in parallel. For example, the at least one collecting device can be provided below at least some of the plurality of first conveyors arranged in parallel and/or below at least some of the plurality of second conveyors arranged in parallel. For example, the at least one flexible element can be adjustable in height.

The flexible element can be designed to support the separation onto one track. Because it is positioned at a distance from the transport surfaces, tipped-over containers and broken containers can be transported under the flexible element and then sorted out, for example.

Between the second group of a plurality of second conveyors arranged in parallel and the one or more third conveyors, following in parallel the second group of the plurality of second conveyors arranged in parallel, there can be provided a further group of a plurality of fourth conveyors arranged in parallel, which can be driven in the first direction and can be designed to convey containers in the first direction.

Such an arrangement can be provided if the plurality of second conveyors arranged in parallel each comprise transport surfaces which can be arranged without steps in adjacent regions, wherein the individual transport surfaces can enclose angles of 0° to +30°, inclusive, with a plane perpendicular to the direction of action of gravity.

At least one intermediate conveyor, which can be arranged transversely to the second direction, can be provided between the second group of a plurality of second conveyors arranged in parallel and the one or more third conveyors. The containers can reach the one or more third conveyors by sliding down the at least one intermediate conveyor. The at least one intermediate conveyor can comprise one or more roller conveyors or one or more knife edge conveyors or one or more similar transport devices.

The at least one intermediate conveyor can cause an acceleration of the containers in the second direction. In comparison to the other embodiments of the container discharge apparatus, in this embodiment, which comprises the at least one intermediate conveyor, there is no acceleration of the containers transverse to the second direction.

A third number of the third conveyors can be smaller or larger than a fourth number of the second conveyors. The third number of the third conveyors can be equal to the fourth number of the second conveyors. The designation, "third number" or "fourth number," serves merely to distinguish the numbers mentioned and has no restrictive meaning.

The invention also relates to a method for operating the container discharge apparatus.

BRIEF DESCRIPTION OF FIGURES

The accompanying figures show, by way of example, aspects and/or embodiments of the invention for better understanding and illustration. In the figures.

DETAILED DESCRIPTION

Figures 1A, 1B:
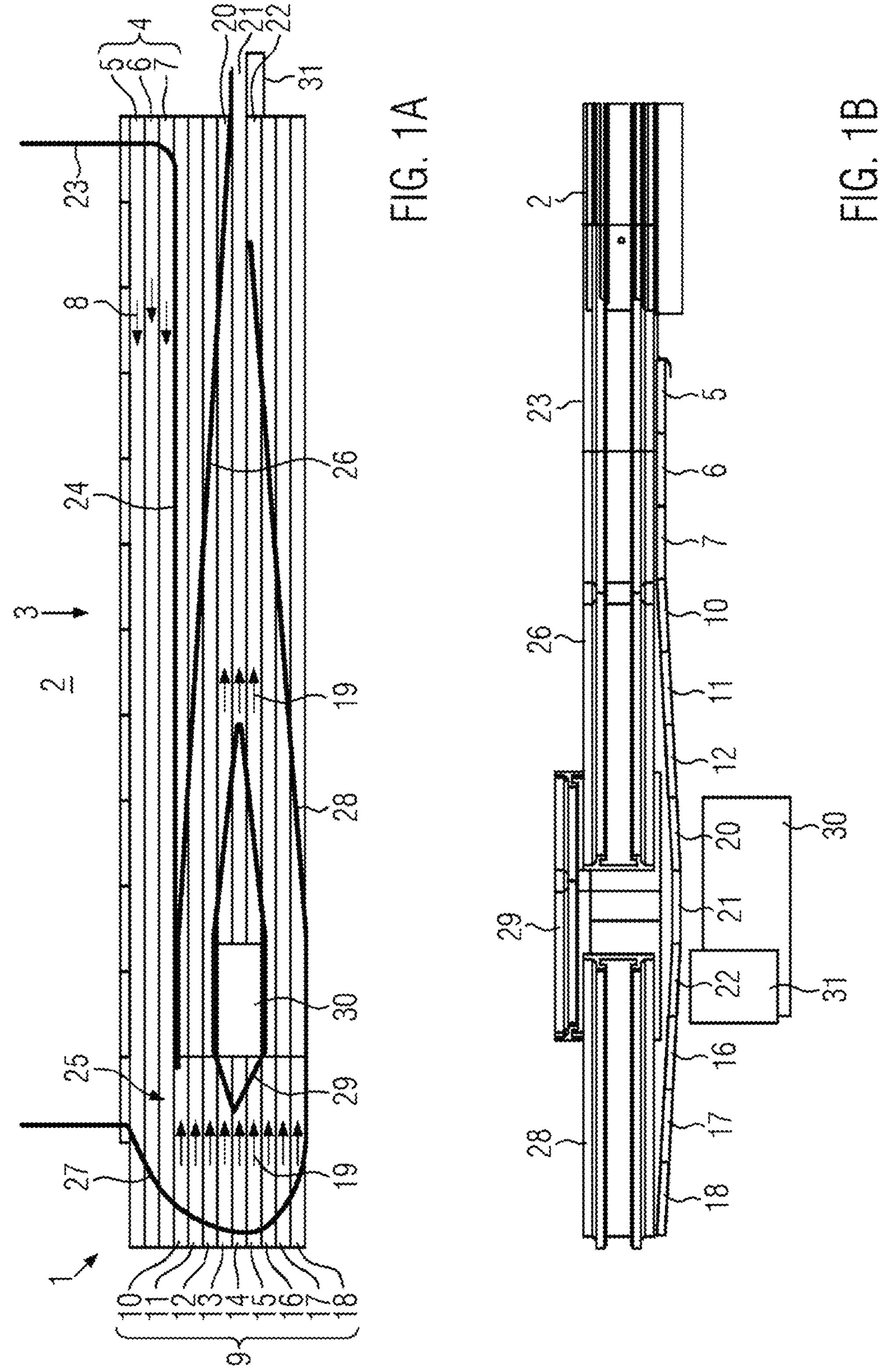
FIG. 1A is a schematic plan view of a first embodiment of the container discharge apparatus.
FIG. 1B is a schematic side view of the first embodiment of the container discharge apparatus.

FIG. 1A shows a schematic plan view of a first embodiment of the container discharge apparatus 1 for discharging containers from a mass flow conveyor 2 and for separating the containers. The mass flow conveyor 2 can transport containers in a transport direction 3. The container discharge apparatus 1 comprises, downstream of the mass flow conveyor 2, a first group 4 of, here, three first conveyors 5, 6, 7 arranged in parallel, which can be driven in a first direction 8 transverse to the transport direction 3 of the mass flow conveyor 2. The first conveyors 5-7 are designed in such a way that they can separate containers and convey them in the first direction 8.

Furthermore, the container discharge apparatus 1 comprises, following in parallel the first group 4 of the three parallel first conveyors 5, 6, 7, a second group 9 of, here, nine second conveyors 10, 11, 12, 13, 14, 15, 16, 17, 18 arranged in parallel, which can be driven in a second direction 19. The second direction 19 is opposite the first direction 8. The second conveyors 10-18 are designed such that they can convey the separated containers in the second direction 19.

In addition, the container discharge apparatus 1 here comprises three third conveyors 20, 21, 22, which are designed in such a way that they can transport the separated containers away in the second direction 19.

At the beginning of the first conveyors 5-7, a first railing 23 is arranged above the transport surfaces of the first conveyors 5-7, the straight portion of which extends transversely to the first conveyors 5-7, with a 90° curve following the straight portion.

Above the transport surfaces, a second railing 24 is provided between the first group 4 and the second group 9, which railing is straight and is designed such that there is a transition region 25 for containers between the first group 4 and the second group 9. The second railing 24 is connected to the first railing 23.

Above the transport surfaces of three of the second conveyors 10, 11, 12, a third railing 26 is provided which leaves the transition region 25 free and extends to the middle of the third conveyor 21. The third railing 26 is straight and is connected to the second railing 24.

At the end of the three first conveyors 5-7 and at the beginning of the nine second conveyors 10-18, a concave railing 27 is provided above the transport surfaces. Here, the concave railing 27 comprises a curve that describes an angle of 180°.

Following the concave railing 27, a fourth railing 28 is provided, which is initially provided above and to the side of one of the second conveyors 18 and then above three of the second conveyors 16, 17, 18, and extends to the middle of the third conveyor 21.

Furthermore, the container discharge apparatus 1 comprises a flexible element 29, which is provided at a distance above, i.e., above the transport surfaces, of five of the second conveyors 12-16. In addition, the flexible element 29 extends at a distance above, i.e., above the transport surfaces, of the three third conveyors 20-22. Because the flexible element 29 is provided at a distance above the transport surfaces of five of the second conveyors 12-16, overturned containers and broken containers, for example, can be ejected into a first collecting device 30 which is arranged below the container discharge apparatus 1. Three second conveyors 13-15 of the five second conveyors 12-16 are made shorter than the remaining second conveyors 10-12, 16-18. This ensures access to the first collecting device 30.

A second collecting device 31 can be provided below, next to the middle one of the third conveyors 21 and following one of the third conveyors 22. For example, overturned containers and broken containers can be ejected into the second collection device 31.

FIG. 1B shows a schematic side view of the first embodiment of the container discharge apparatus 1, viewed in the first direction 8. In addition to the first railing 23, the third railing 26, the fourth railing 28, and the flexible element 29, the first conveyors 5-7, the second conveyors 10-12, 16-18, the third conveyors 20-22, the first collecting device 30, and the second collecting device 31 are visible.

The transport surfaces of the first conveyors 5-7 are arranged without steps in adjacent regions, and the individual transport surfaces enclose an angle of 0° with a plane perpendicular to the direction of action of gravity, i.e., they run horizontally.

The transport surface of the first conveyor 7 and the transport surface of the second conveyor 10 are arranged without steps in adjacent regions.

The transport surfaces of four of the second conveyors 10-13 (only the second conveyors 10-12 are visible) are arranged in adjacent regions without steps, and the individual transport surfaces enclose an angle of −5° with a plane perpendicular to the direction of action of gravity. The transport surface of the second conveyor 14 (not visible) encloses an angle of 0° with a plane perpendicular to the direction of action of gravity. The transport surfaces of four of the second conveyors 15-18 (only the second conveyors 16-18 are visible) are arranged in adjacent regions without steps, and the individual transport surfaces enclose an angle of +5° with a plane perpendicular to the direction of action of gravity. All transport surfaces of the second conveyors 10-18 are arranged in adjacent regions without steps.

The transport surface of the third conveyor 20 encloses an angle of −5° with a plane perpendicular to the direction of action of gravity. The transport surface of the third conveyor 21 encloses an angle of 0° with a plane perpendicular to the direction of action of gravity. The transport surface of the third conveyor 22 encloses an angle of +5° with a plane perpendicular to the direction of action of gravity.

Figure 1C:
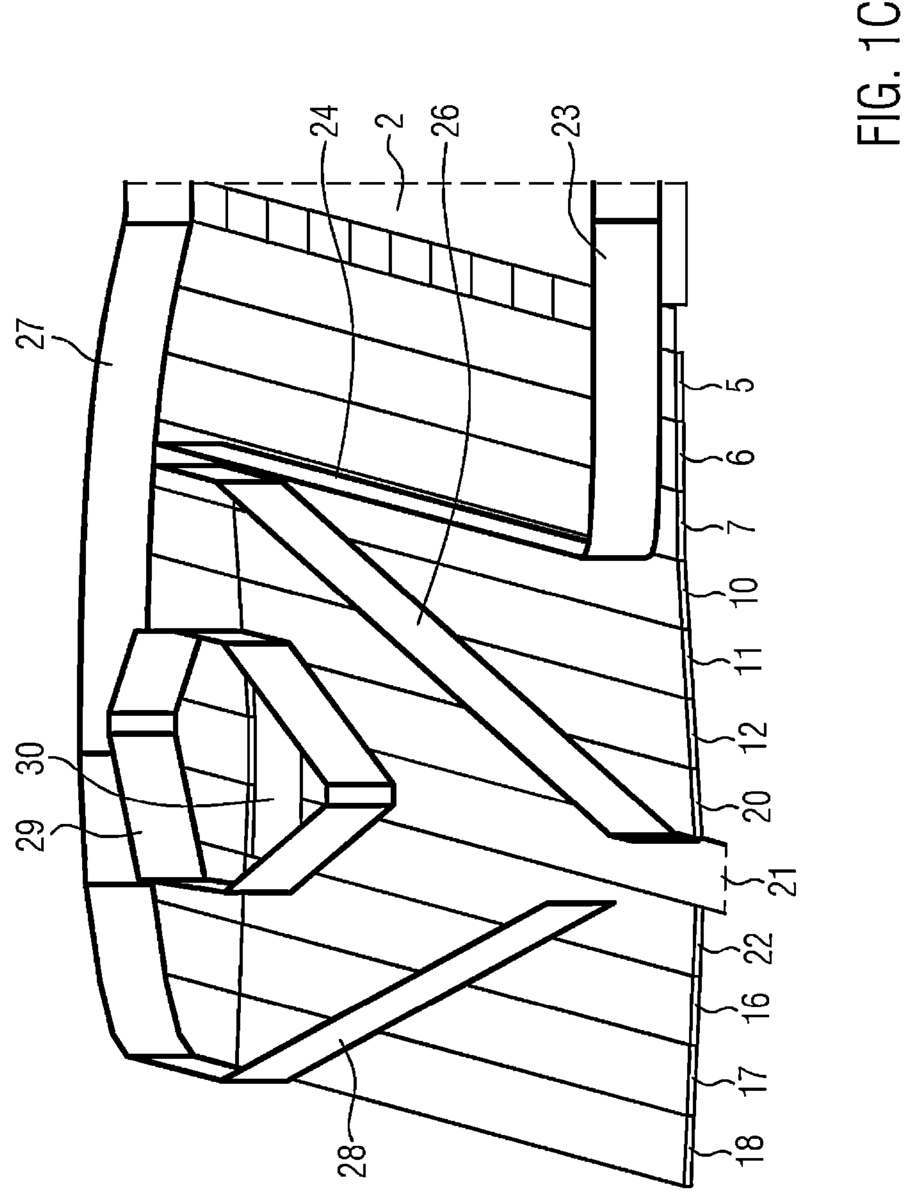
FIG. 1C is a schematic oblique view of the first embodiment of the container discharge apparatus from above, with a viewing direction in the first direction.

FIG. 1C shows a schematic oblique view of the first embodiment of the container discharge apparatus 1 from above, with a viewing direction in the first direction 8. In addition to the first railing 23, the second railing 24, the third railing 26, the concave railing 27, the fourth railing 28, and the flexible element 29, the first conveyors 5-7, the second conveyors 10-18, the third conveyors 20-22, the first collecting device 30, and the second collecting device 31 are visible.

Figure 1D:
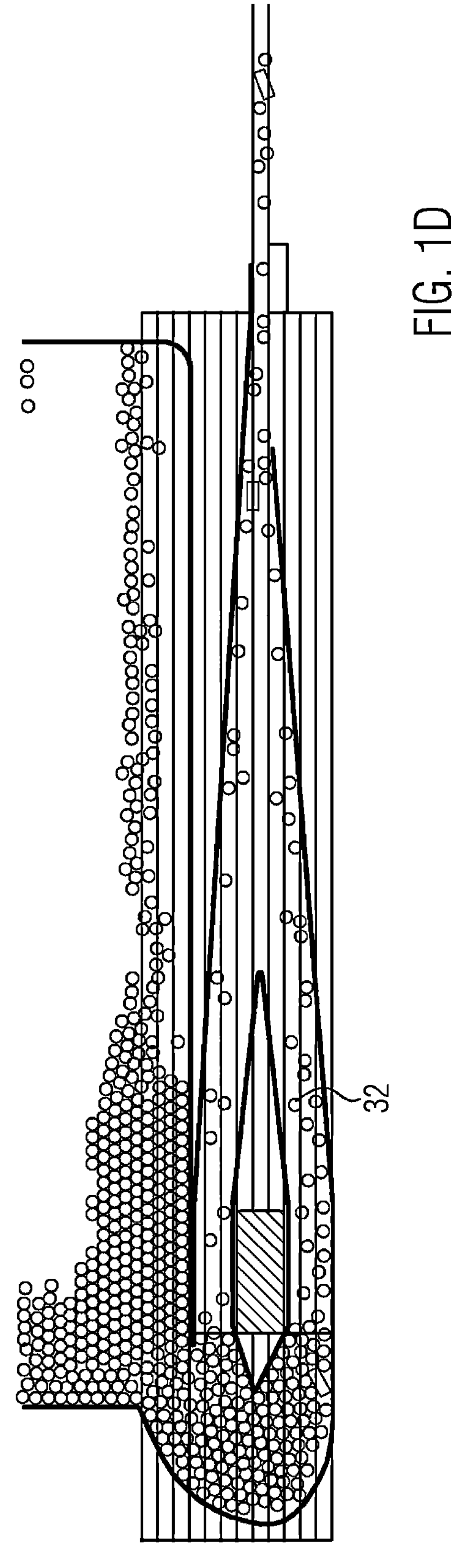
FIG. 1D is a schematic plan view of the first embodiment of the container discharge apparatus with containers located therein.

FIG. 1D shows a schematic plan view of the first embodiment of the container discharge apparatus 1 with containers 32 located therein. As containers are transported by the first conveyors 5-7 in the first direction 8, the containers jostle at the end of the first conveyors 5-7 and as a result, and due to the concave railing 27, reach the transition region 25 and move towards the second conveyors 10-18, by which they are moved in the second direction 19. The third railing 26 and the fourth railing 28 as well as the inclined design of the second conveyors 10-13, 15-18 and of the third conveyors 20, 22 transport the containers 55 towards the third conveyor 21, which can transport away the separated containers 55.

Figures 2A, 2B:
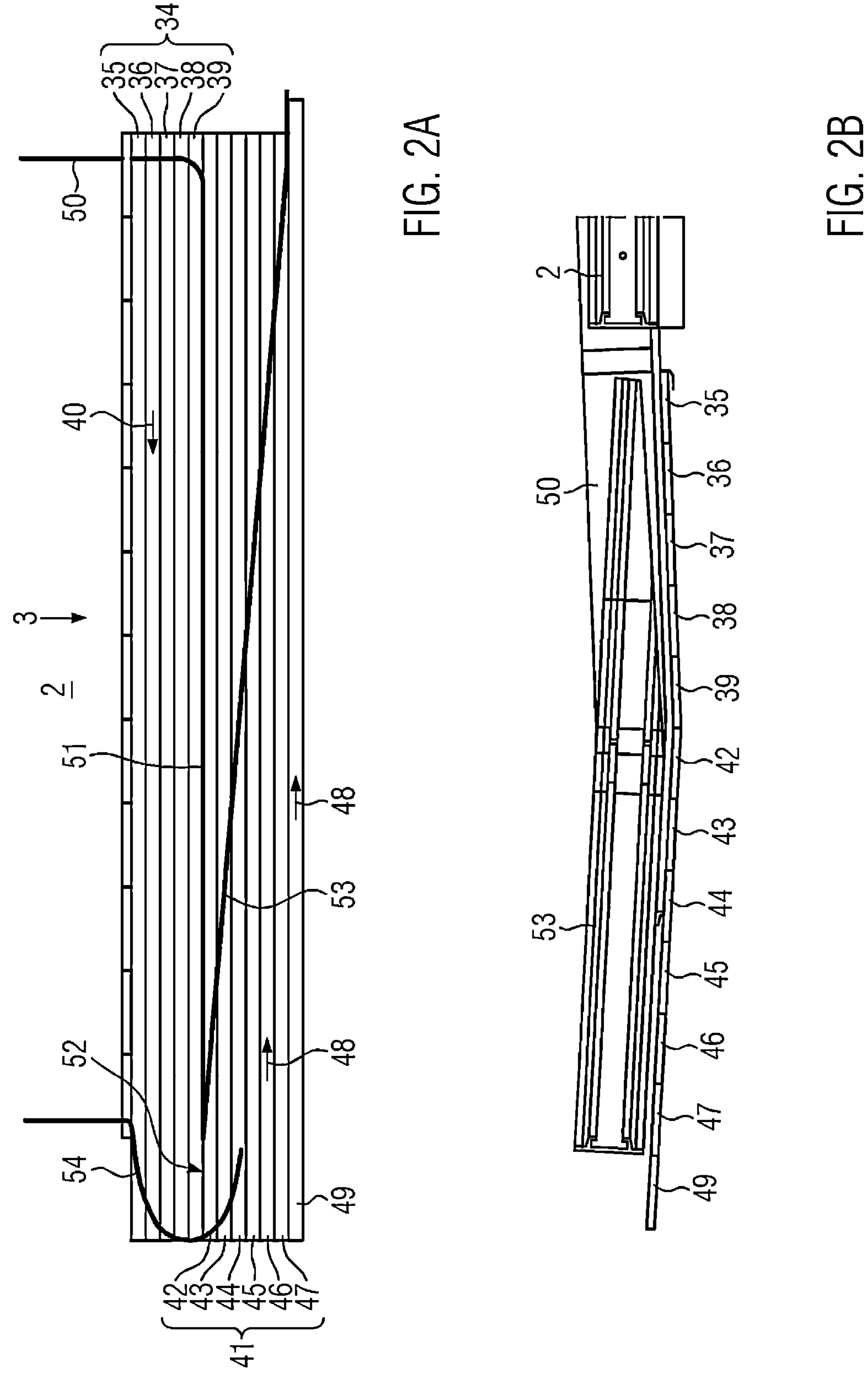
FIG. 2A is a schematic plan view of a second embodiment of the container discharge apparatus.
FIG. 2B is a schematic side view of the second embodiment of the container discharge apparatus.

FIG. 2A shows a schematic plan view of a second embodiment of the container discharge apparatus 33 for discharging containers from the mass flow conveyor 2 described above, and for separating the containers. The container discharge apparatus 33 comprises, downstream of the mass flow conveyor 2, a first group 34 of, here, five first conveyors 35, 36, 37, 38, 39 arranged in parallel, which can be driven in a first direction 40 transverse to the transport direction 3 of the mass flow conveyor 2. The first conveyors 35-39 are designed in such a way that they can separate containers and convey them in the first direction 40.

Furthermore, the container discharge apparatus 33 comprises, following in parallel the first group 34 of the five first conveyors 35-39 arranged in parallel, a second group 41 of, here, six second conveyors 42, 43, 44, 45, 46, 47 arranged in parallel, which can be driven in a second direction 48. The second direction 48 is opposite the first direction 40. The second conveyors 42-46 are designed such that they can convey the separated containers in the second direction 47.

In addition, the container discharge apparatus 33 here comprises a third conveyor 49 which is designed such that it can transport the separated containers away in the second direction 48.

At the beginning of the first conveyors 35-39, a first railing 50 is arranged above the transport surfaces of the first conveyors 35-39, the straight portion of which extends transversely to the first conveyors 35-39, with a 90° curve following the straight portion.

Above the transport surfaces, a second railing 51 is provided between the first group 34 and the second group 41, which railing is straight and is designed such that there is a transition region 52 for containers between the first group 34 and the second group 41. The second railing 51 is connected to the first railing 50.

A third railing 53 is provided above the transport surfaces of the second conveyors 42-47, which railing leaves the transition region 52 free and extends to the third conveyor 49. The third railing 53 is straight and is connected to the second railing 51.

At the end of the five first conveyors 35-39 and at the beginning of three of the six second conveyors 42-44, a concave railing 54 is provided above the transport surfaces. Here, the concave railing 54 comprises a curve that describes an angle of 180°.

FIG. 2B shows a schematic side view of the second embodiment of the container discharge apparatus 33, viewed in the first direction 40. In addition to the first railing 50 and the third railing 53, the first conveyors 35-39, the second conveyors 42-47, and the third conveyor 48 can be seen.

The transport surfaces of the first conveyors 35-39 are arranged without steps in adjacent regions, and the individual transport surfaces enclose an angle of −10° with a plane perpendicular to the direction of action of gravity.

The transport surface of the first conveyor 39 and the transport surface of the second conveyor 42 are arranged without steps in adjacent regions.

The transport surfaces of the second conveyors 42-47 are arranged without steps in adjacent regions, and the individual transport surfaces enclose an angle of +5° with a plane perpendicular to the direction of action of gravity.

The transport surface of the third conveyor 49 encloses an angle of +5° with a plane perpendicular to the direction of action of gravity.

Figure 2C:
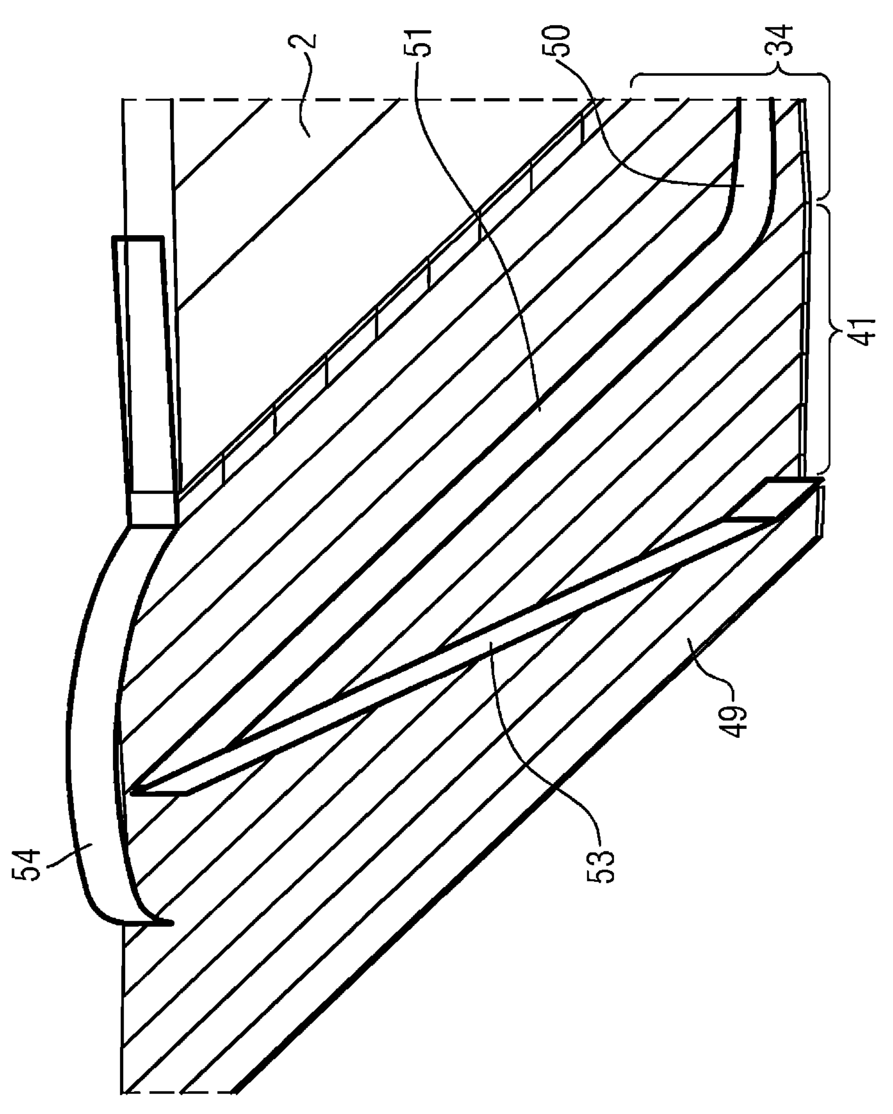
FIG. 2C is a schematic oblique view of the second embodiment of the container discharge apparatus from above, with a viewing direction in the first direction.

FIG. 2C shows a schematic oblique view of the second embodiment of the container discharge apparatus 33 from above, with a viewing direction in the first direction 40. In addition to the first railing 50, the second railing 51, the third railing 53, and the concave railing 54, the first conveyors 35-39, the second conveyors 42-47, and the third conveyor 49 can be seen.

Figure 2D:
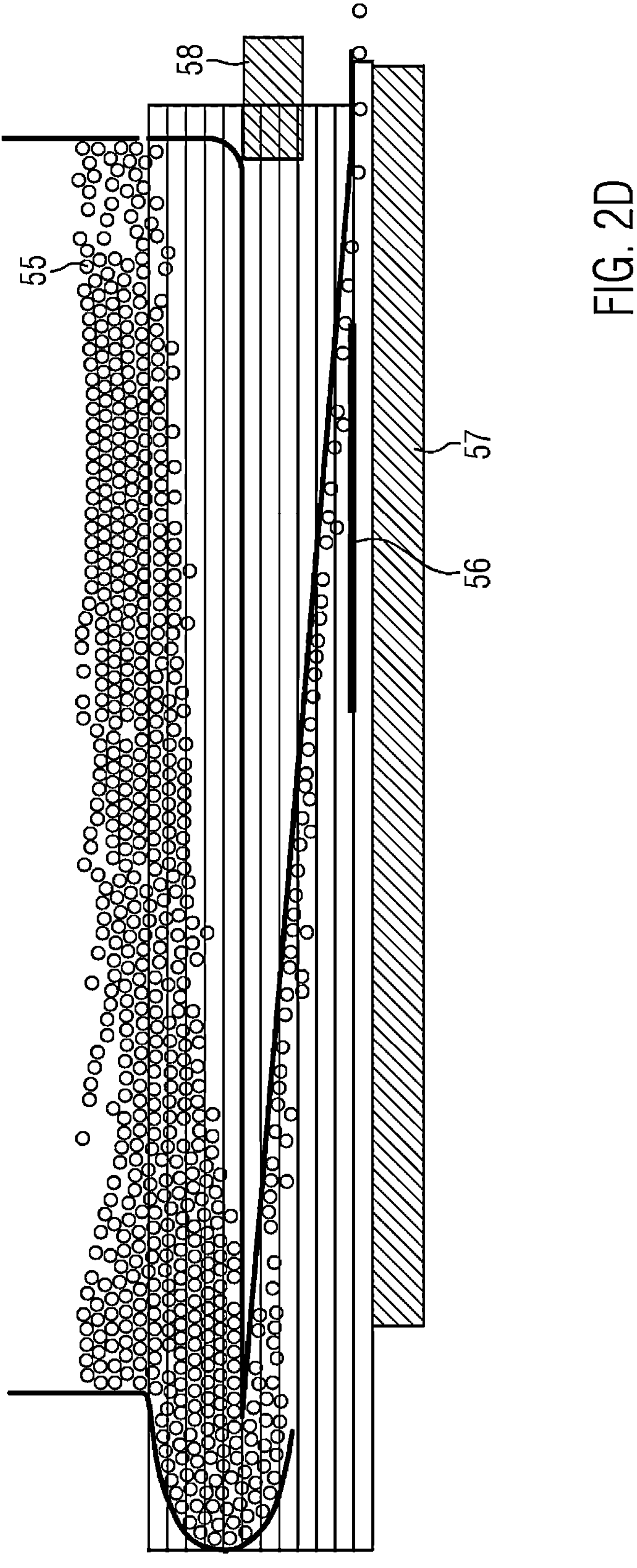
FIG. 2D is a schematic plan view of the second embodiment of the container discharge apparatus with containers located therein.

FIG. 2D shows a schematic plan view of the second embodiment of the container discharge apparatus with containers 55 located therein. Due to the transport of containers 55 by means of the first conveyors 35-39 in the first direction 40, the containers jostle at the end of the first conveyors 35-39 and as a result, and due to the concave railing 54, reach the transition region 52 and move towards the second conveyors 42-47, by which they are moved in the second direction 48. Due to the third railing 53 and the transport in the second direction 47 by the second conveyors 42-47, the containers 55 are transported towards the third conveyor 49, which can transport away the separated containers 55.

Optionally, the container discharge apparatus 33 can comprise a flexible element 56 arranged in a region between the second conveyor 47 and the third conveyor 49. A first collecting device 57 can be provided in parallel below and next to the third conveyor 49. A second collecting device 58 can be provided arranged partly below the end of the second conveyors 42-44.

Figures 3A, 3B:
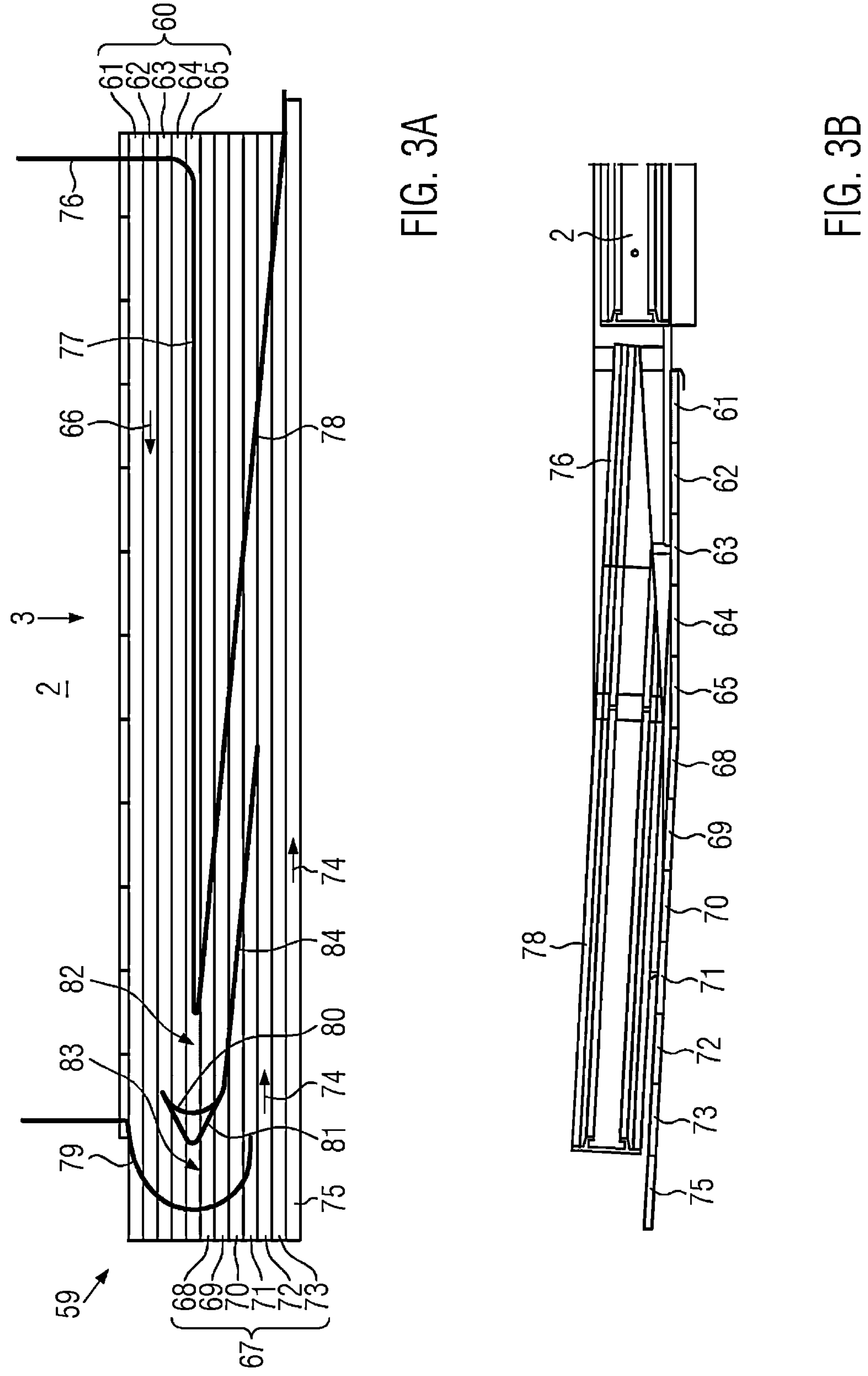
FIG. 3A is a schematic plan view of a third embodiment of the container discharge apparatus.
FIG. 3B is a schematic side view of the third embodiment of the container discharge apparatus.

FIG. 3A shows a schematic plan view of a third embodiment of the container discharge apparatus 59 for discharging containers from the mass flow conveyor 2 described above, and for separating the containers. The container discharge apparatus 59 comprises, downstream of the mass flow conveyor 2, a first group 60 of, here, five first conveyors 61, 62, 63, 64, 65 arranged in parallel, which can be driven in a first direction 66 transverse to the transport direction 3 of the mass flow conveyor 2. The first conveyors 61-65 are designed such that they can separate containers and convey them in the first direction 66.

Furthermore, the container discharge apparatus 59 comprises, following in parallel the first group 60, a second group 67 of, here, six second conveyors 68, 69, 70, 71, 72, 73 arranged in parallel, which can be driven in a second direction 74. The second direction 74 is opposite the first direction 66. The second conveyors 68-73 are designed such that they can convey the separated containers in the second direction 74.

In addition, the container discharge apparatus 59 here comprises a third conveyor 75 which is designed such that it can transport the separated containers away in the second direction 74.

At the beginning of the first conveyors 61-65, a first railing 76 is arranged above the transport surfaces of the first conveyors 61-65, the straight portion of which railing extends transversely to the first conveyors 61-65, with a 90° curve following the straight portion.

Above the transport surfaces, a second railing 77 is provided between the first group 60 and the second group 67, which railing is straight and designed in such a way that there is a transition region for containers between the first group 60 and the second group 67. The second railing 77 is connected to the first railing 76.

A third railing 78 is provided above the transport surfaces of the second conveyors 68-73, which railing leaves the transition region free and extends to the third conveyor 75. The third railing 78 is straight and is connected to the second railing 77.

At the end of the five first conveyors 61-65 and at the beginning of four of the six second conveyors 68-71, a first concave railing 79 is provided above the transport surfaces. Here, the first concave railing 79 comprises a curve that describes an angle of 180°.

The transition region is divided by a second concave railing 80 into a first partial transition region 82 and a second partial transition region 83, wherein the second concave railing 80 is arranged above three of the first conveyors 63, 64, 65 and two of the second conveyors 68, 69. The second concave railing 80 is triangularly tapered on the surface 81 opposite the concave surface. Following the end of the second concave railing 80, which is located above the second conveyor 69, a fourth railing 84 is provided which extends parallel to the third railing 78 and up to the second conveyor 72.

FIG. 3B shows a schematic side view of the third embodiment of the container discharge apparatus 59, viewed in the first direction 66. In addition to the first railing 76 and the third railing 78, the first conveyors 61-65, the second conveyors 68-73, and the third conveyor 75 can be seen.

The transport surfaces of the first conveyors 61-65 are arranged without steps in adjacent regions, and the individual transport surfaces enclose an angle of 0° with a plane perpendicular to the direction of action of gravity.

The transport surface of the first conveyor 65 and the transport surface of the second conveyor 68 are arranged without steps in adjacent regions.

The transport surfaces of the second conveyors 68-73 are arranged without steps in adjacent regions, and the individual transport surfaces enclose an angle of +15° with a plane perpendicular to the direction of action of gravity.

The transport surface of the third conveyor 75 encloses an angle of +15° with a plane perpendicular to the direction of action of gravity.

Figure 3C:
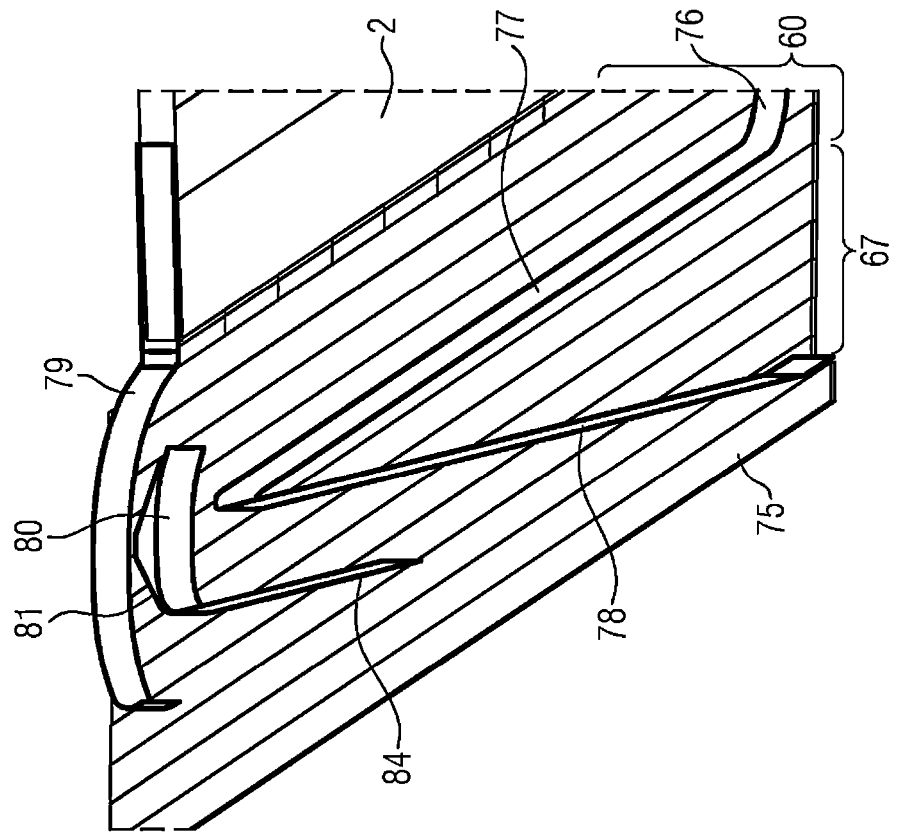
FIG. 3C is a schematic oblique view of the third embodiment of the container discharge apparatus from above, with a viewing direction in the first direction.

FIG. 3C shows a schematic oblique view of the third embodiment of the container discharge apparatus 59 from above, with a viewing direction in the first direction 66. In addition to the first railing 76, the second railing 77, the third railing 78, the first concave railing 79, the second concave railing 80 with a triangular tapered surface 81, and the fourth railing 84, the first conveyors 61-65, the second conveyors 68-73, and the third conveyor 75 can be seen.

Figure 3D:
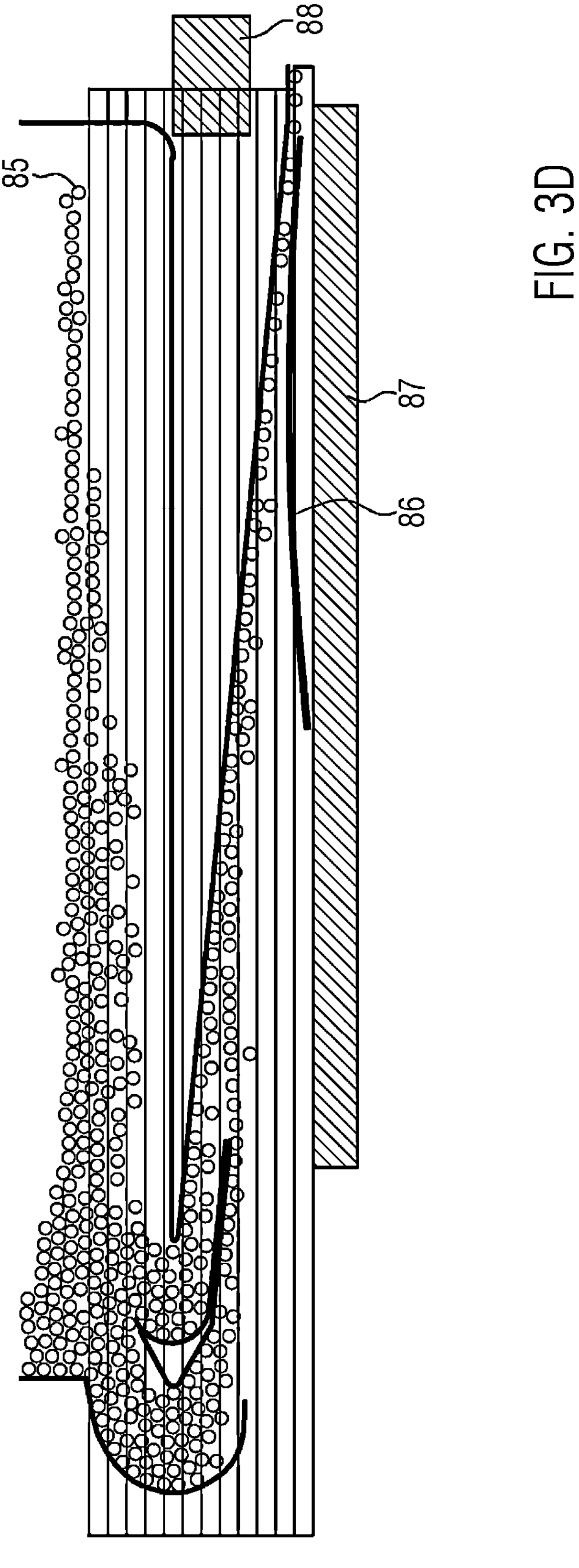
FIG. 3D is a schematic plan view of the third embodiment of the container discharge apparatus with containers located therein.

FIG. 3D shows a schematic plan view of the third embodiment of the container discharge apparatus 59 with containers 85 located therein. Due to the transport of containers 85 by means of the first conveyors 61-65 in the first direction 66, the containers (i) jostle at the second concave railing 80 and as a result reach the first partial transition region 82 and move towards the second conveyors 68-73, and (ii) jostle at the end of the first conveyors 61-65 and as a result, and due to the concave railing 79 and the triangularly tapering surface 81, reach the second partial transition region 83 and move towards the second conveyors 68-73, by which they are moved in the second direction 74. Due to the third railing 78, the fourth railing 84, and the transport in the second direction 74 by the second conveyors 68-73, the containers 85 are transported towards the third conveyor 75, which can transport the separated containers 85 away.

Optionally, the container discharge apparatus 59 can comprise a flexible element 86, which is arranged partially above the second conveyor 73 and the third conveyor 75. A first collecting device 87 can be provided in parallel below and next to the third conveyor 75. A second collecting device 88 can be provided arranged partly below the end of the second conveyors 68-71.

Figures 4A, 4B:
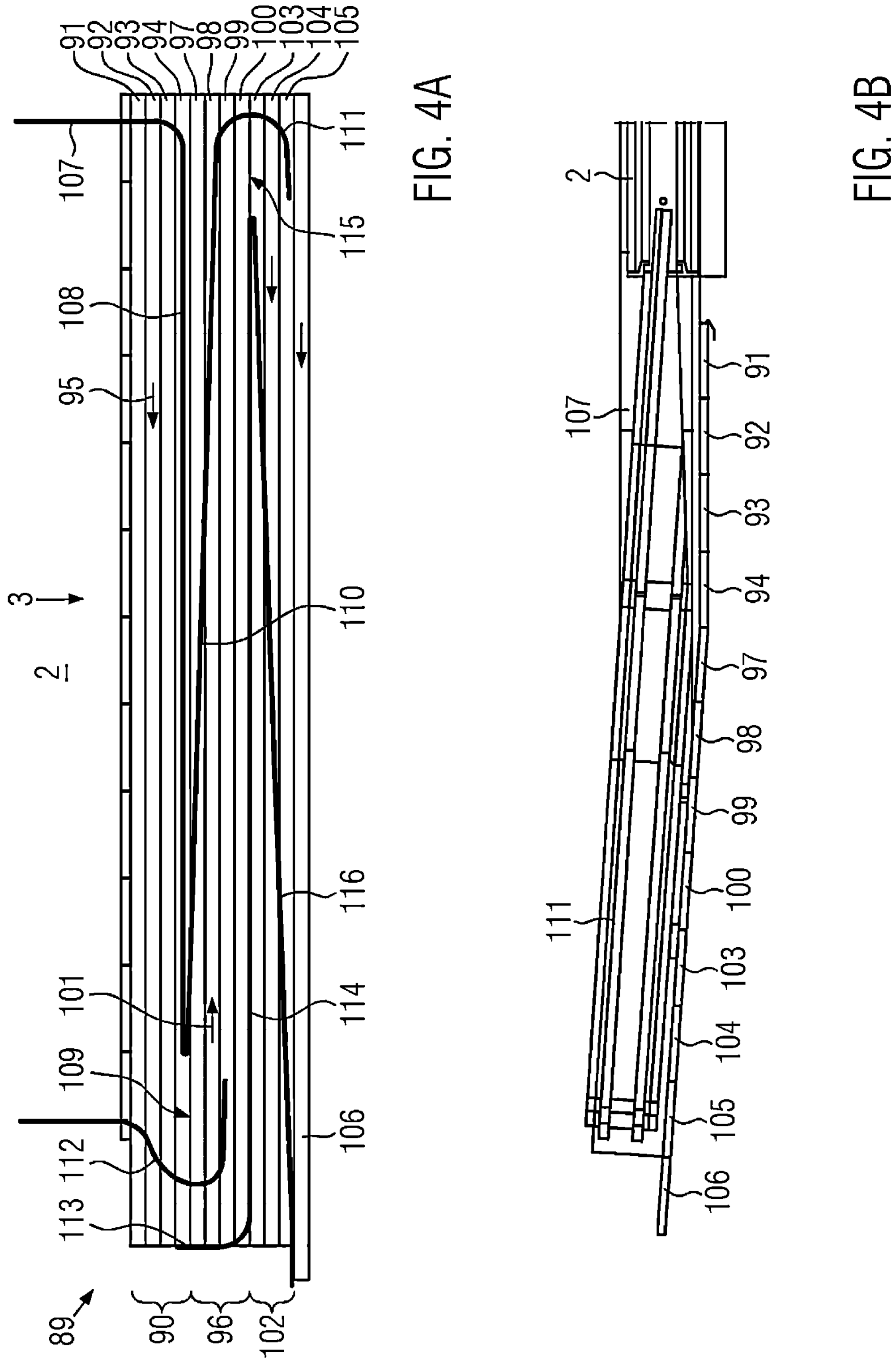
FIG. 4A is a schematic plan view of a fourth embodiment of the container discharge apparatus.
FIG. 4B is a schematic side view of the fourth embodiment of the container discharge apparatus.

FIG. 4A shows a schematic plan view of a fourth embodiment of the container discharge apparatus 89 for discharging containers from the mass flow conveyor 2 described above, and for separating the containers. The container discharge apparatus 89 comprises, downstream of the mass flow conveyor 2, a first group 90 of, here, four first conveyors 91, 92, 93, 94 arranged in parallel, which can be driven in a first direction 95 transverse to the transport direction 3 of the mass flow conveyor 2. The first conveyors 91-94 are designed such that they can separate containers and convey them in the first direction 95.

Furthermore, the container discharge apparatus 89 comprises, following in parallel the first group 90, a second group 96 of, here, four second conveyors 97, 98, 99, 100 arranged in parallel, which can be driven in a second direction 101. The second direction 101 is opposite the first direction 95. The second conveyors 97-100 are designed such that they can convey the separated containers in the second direction 101.

Furthermore, the container discharge apparatus 89 comprises, following in parallel the first group 96, a third group 102 of, here, three third conveyors 103, 104, 105 arranged in parallel, which can be driven in the first direction 95. The third conveyors 103-105 are designed in such a way that they can convey the separated containers in the first direction 95

Furthermore, the container discharge apparatus 89 comprises a fourth conveyor 106, which is designed such that it can transport away the separated containers in the first direction 95.

At the beginning of the first conveyors 91-94, a first railing 107 is arranged above the transport surfaces of the first conveyors 91-94, the straight portion of which railing extends transversely to the first conveyors 91-94, with a 90° curve following the straight portion.

Above the transport surfaces, a second railing 108 is provided between the first group 90 and the second group 96, which railing is straight and is designed such that there is a first transition region 109 for containers between the first group 90 and the second group 96. The second railing 108 is connected to the first railing 107.

A third railing 110 is provided above the transport surfaces of the second conveyors 97-100, which railing leaves the first transition region 109 free and extends to the second conveyor 98. The third railing 110 is straight and is connected to the second railing 108. A first concave railing 111 is provided downstream of the third railing 110. Here, the concave railing 111 comprises a curve that describes an angle of 180°. The concave railing 111 extends to the third conveyor 105.

At the end of the first conveyors 91-94 and at the beginning of three of the second conveyors 97-99, a second concave railing 112 is provided above the transport surfaces. Here, the second concave railing 112 comprises a curve that describes an angle of 180°.

At the beginning of the second conveyors 97-100, a first railing 113 is arranged above the transport surfaces of the second conveyors 97-100, the straight portion of which railing extends transversely to the second conveyors 97-100, with a 90° curve following the straight portion.

Above the transport surfaces, a fifth railing 114 is provided between the second group 96 and the third group 102, which railing is straight and is designed such that there is a second transition region 115 for containers between the second group 96 and the third group 102. The fifth railing 114 is connected to the fourth railing 113.

Above the transport surfaces of the third conveyors 103-105, a fifth railing 116 is provided, which leaves the second transition region 115 free and extends to the fourth conveyor 106. The fifth railing 116 is straight and is connected to the fourth railing 114.

FIG. 4B shows a schematic side view of the fourth embodiment of the container discharge apparatus 89, viewed in the first direction 95. In addition to the first railing 107 and the first concave railing 111, the first conveyors 91-94, the second conveyors 97-100, the third conveyors 103-105, and the fourth conveyors 106 can be seen.

The transport surfaces of the first conveyors 91-94 are arranged without steps in adjacent regions, and the individual transport surfaces enclose an angle of 0° with a plane perpendicular to the direction of action of gravity.

The transport surface of the first conveyor 94 and the transport surface of the second conveyor 97 are arranged without steps in adjacent regions.

The transport surfaces of the second conveyors 97-100 are arranged without steps in adjacent regions, and the individual transport surfaces enclose an angle of +10° with a plane perpendicular to the direction of action of gravity.

The transport surface of the second conveyor 100 and the transport surface of the third conveyor 103 are arranged without steps in adjacent regions.

The transport surfaces of the third conveyors 103-105 are arranged without steps in adjacent regions, and the individual transport surfaces enclose an angle of +10° with a plane perpendicular to the direction of action of gravity.

The transport surface of the third conveyor 105 and the transport surface of the fourth conveyor 106 are arranged without steps in adjacent regions.

The transport surface of the fourth conveyor 106 encloses an angle of +10° with a plane perpendicular to the direction of action of gravity.

Figure 4C:
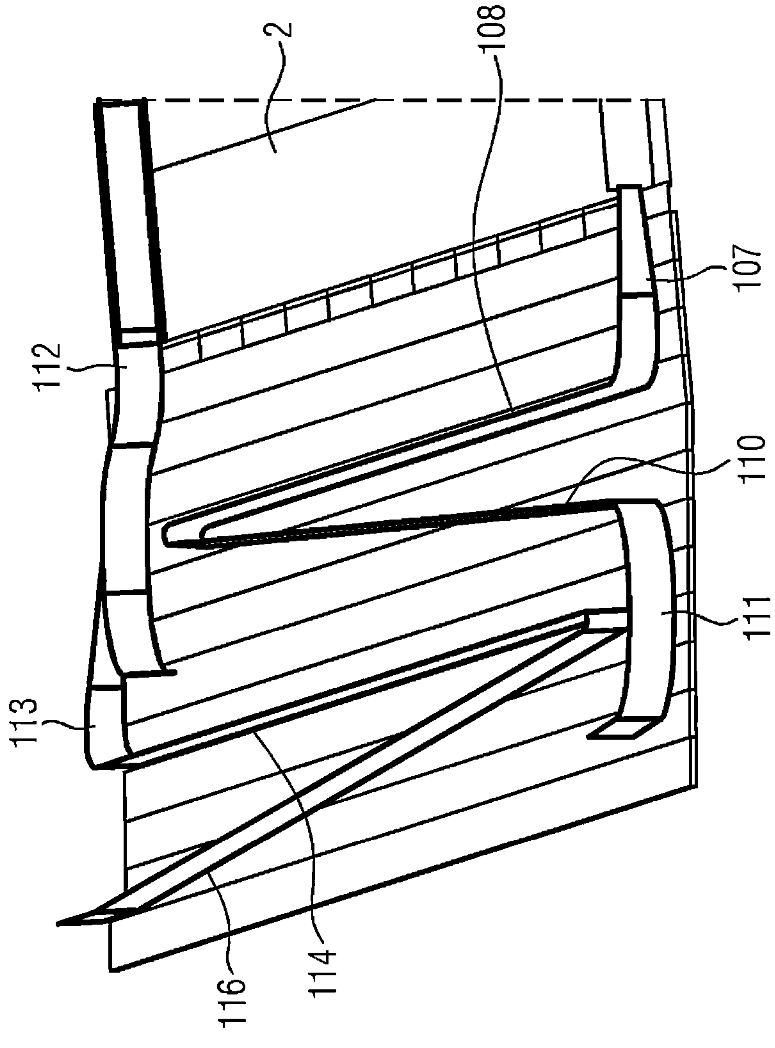
FIG. 4C is a schematic oblique view of the fourth embodiment of the container discharge apparatus from above, with a viewing direction in the first direction.

FIG. 4C shows a schematic oblique view of the fourth embodiment of the container discharge apparatus 89 from above, with a viewing direction in the first direction 95. In addition to the first railing 107, the second railing 108, the third railing 110, the first concave railing 111, the second concave railing 112, the fourth railing 113, the fifth railing 114, and the sixth railing 116, the first conveyors 91-94, the second conveyors 97-100, the third conveyors 103-105, and the fourth conveyor 106 can be seen.

Figure 4D:
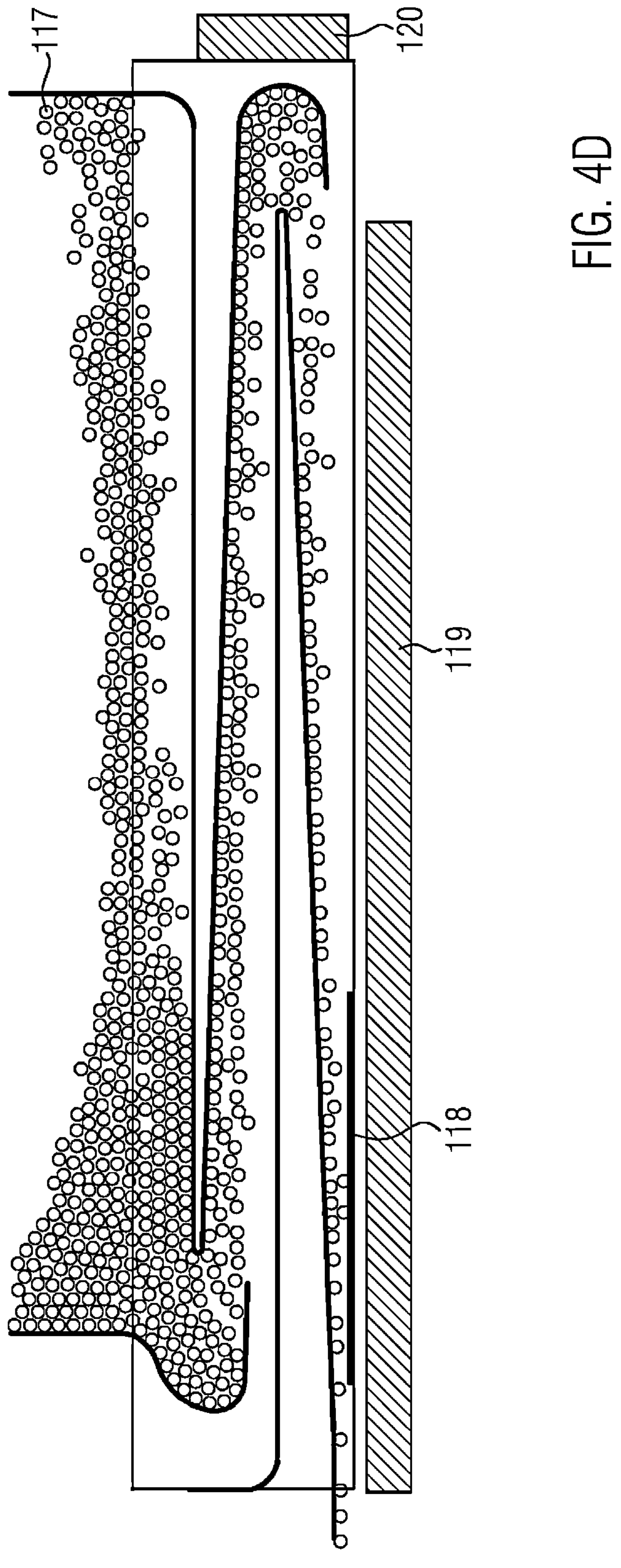
FIG. 4D is a schematic plan view of the fourth embodiment of the container discharge apparatus with containers located therein.

FIG. 4D shows a schematic plan view of the fourth embodiment of the container discharge apparatus 89 with containers 117 located therein. Due to the transport of containers 117 by means of the first conveyors 91-94 in the first direction 95, the containers 117 jostle at the end of the first conveyors 91-94 and as a result, and due to the first concave railing 111, reach the first transition region 109 and move towards the second conveyors 97-100, by which they are moved in the second direction 101. Due to the third railing 110 and the transport in the second direction 101 by the second conveyors 97-100, the containers 117 are transported towards the third conveyors 103-105.

At the end of the second conveyors 97-100, the containers 117 jostle and as a result, and due to the second concave railing 112, reach the second transition region 115 and move towards the third conveyors 103-105, by which they are moved in the first direction 95. Due to the fifth railing 116 and the transport in the first direction 95 by the third conveyors 103-105, the containers 117 are transported towards the fourth conveyor 106.

Optionally, the container discharge apparatus 89 can include a flexible element 118 arranged in a region between the third conveyor 105 and the fourth conveyor 106. A first collecting device 119 can be provided in parallel below and next to the fourth conveyor 106. A second collecting device 120 can be provided arranged partly below the end of the second conveyors 97-100 and of the third conveyors 103-105.

Figures 5A, 5B:
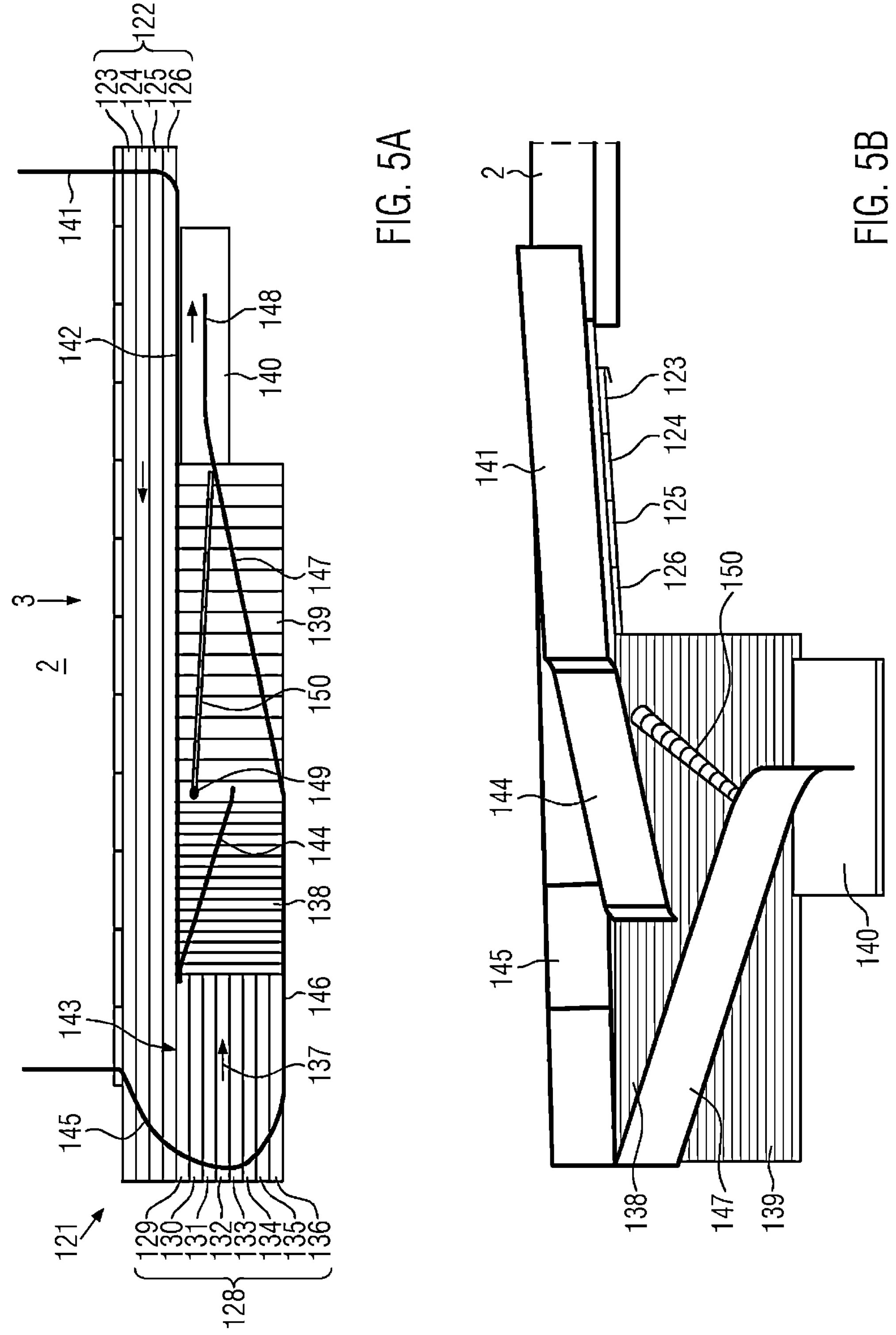
FIG. 5A is a schematic plan view of a fifth embodiment of the container discharge apparatus.
FIG. 5B is a first schematic side view of the fifth embodiment of the container discharge apparatus.

FIG. 5A shows a schematic plan view of a fifth embodiment of the container discharge apparatus 121 for discharging containers from the mass flow conveyor 2 described above, and for separating the containers. The container discharge apparatus 121 comprises, downstream of the mass flow conveyor 2, a first group 122 of, here, four first conveyors 123, 124, 125, 126 arranged in parallel, which can be driven in a first direction 127 transverse to the transport direction 3 of the mass flow conveyor 2. The first conveyors 123-126 are designed such that they can separate containers and convey them in the first direction 127.

Furthermore, the container discharge apparatus 121 comprises, following in parallel the first group 122, a second group 128 of, here, eight second conveyors 129, 130, 131, 132, 133, 134, 135, 136 arranged in parallel which can be driven in a second direction 137. The second direction 137 is opposite the first direction 127. The second conveyors 129-136 are designed such that they can convey the separated containers in the second direction 137.

In addition, the container discharge apparatus 121 comprises, following the second conveyors 129-136, a first intermediate conveyor 138 arranged transversely thereto and, following the first intermediate conveyor 138, a second intermediate conveyor 139, also arranged transversely to the second conveyors 129-136. Following the second intermediate conveyor 139, there is arranged a third conveyor 140, which can be driven in the second direction 137 and which is designed such that it can transport away the separated containers in the second direction 137. The first and second intermediate conveyors 138, 139 can cause an acceleration of the containers in the second direction 137. In comparison to the other embodiments of the container discharge apparatus, in this fifth embodiment, there is no acceleration of the containers transverse to the second direction 137.

At the beginning of the first conveyors 123-126, a first railing 141 is arranged above the transport surfaces of the first conveyors 123-126, the straight portion of which railing extends transversely to the first conveyors 123-126, with a 90° curve following the straight portion.

Above the transport surfaces, a second railing 142 is provided between the first group 122 and the second group 128, which railing is straight and is designed such that there is a transition region 143 for containers between the first group 122 and the second group 128. The second railing 142 is connected to the first railing 141.

A third railing 144 is provided above the transport surfaces of the first intermediate conveyor 138, which third railing is oriented obliquely over the one half of the first intermediate conveyor 138 and extends up to the second intermediate conveyor 139. The third railing 144 is straight and is connected to the second railing 142.

At the end of the first conveyors 123-126 and at the beginning of the second conveyors 129-136, a concave railing 145 is provided above the transport surfaces. Here, the concave railing 145 comprises a curve that describes an angle of 180°. Following the concave railing 145, a fourth railing 146 is arranged above and next to the second conveyor 136, which railing runs parallel to the second conveyor 136 and is straight. Following the fourth railing 146, there is arranged a fifth railing 147 which is oriented above the transport surfaces of the second intermediate conveyor 139 at an angle, over two-thirds of the second intermediate conveyor 139, and extends to above the third conveyor 140. Following the fifth railing 147, there is provided a sixth railing 148 which extends above the third conveyor 140 and is arranged parallel to the second railing 142.

In addition, a flexible element 150 is arranged above the transport surface of the second intermediate conveyor 139 in the region accessible for containers to be discharged and separated, which element is designed to be movable at one end about a pivot point 149.

FIG. 5B shows a schematic side view of the fifth embodiment of the container discharge apparatus 121, viewed in the first direction 127. In addition to the first railing 141, the third railing 144, the concave railing 145, the fifth railing 147, and the flexible element 150, the first conveyors 123-126, the first intermediate conveyor 138, the second intermediate conveyor 139, and the third conveyor 140 can be seen.

The transport surfaces of the first conveyors 123-126 are arranged without steps in adjacent regions, and the individual transport surfaces enclose an angle of −5° with a plane perpendicular to the direction of action of gravity.

The transport surface of the first conveyor 126 and the transport surface of the second conveyor 129 are arranged without steps in adjacent regions.

The transport surfaces of the second conveyors 129-136 are arranged without steps in adjacent regions, and the individual transport surfaces enclose an angle of 0° with a plane perpendicular to the direction of action of gravity.

The transport surfaces of the first intermediate conveyor 138, the second intermediate conveyor 139, and the third conveyor 140 enclose an angle of −15° with a plane perpendicular to the direction of action of gravity.

Figure 5C:
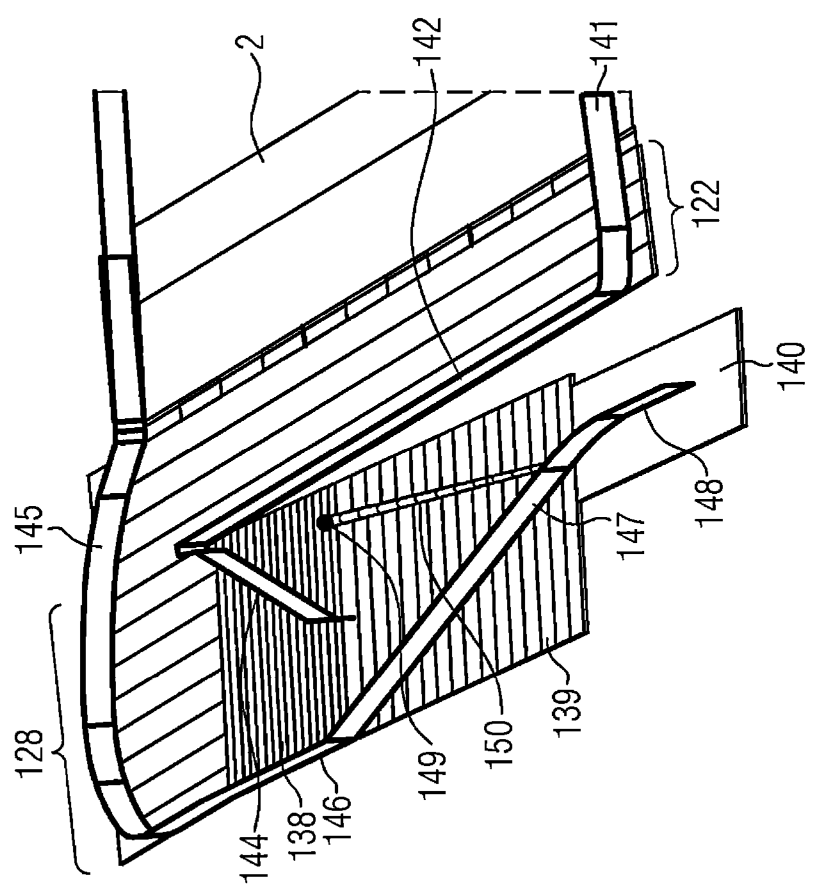
FIG. 5C is a schematic side view of the fifth embodiment of the container discharge apparatus.

FIG. 5C shows a schematic oblique view of the fifth embodiment of the container discharge apparatus 121 from above, with a viewing direction in the first direction 127. In addition to the first railing 141, the second railing 142, the third railing 144, the concave railing 145, the fourth railing 146, the fifth railing 147, the sixth railing 148, and the flexible element 150, the first conveyors 123-126, the second conveyors 129-136, the first intermediate conveyor 138, the second intermediate conveyor 139, and the third conveyor 140 can be seen.

Figure 5D:
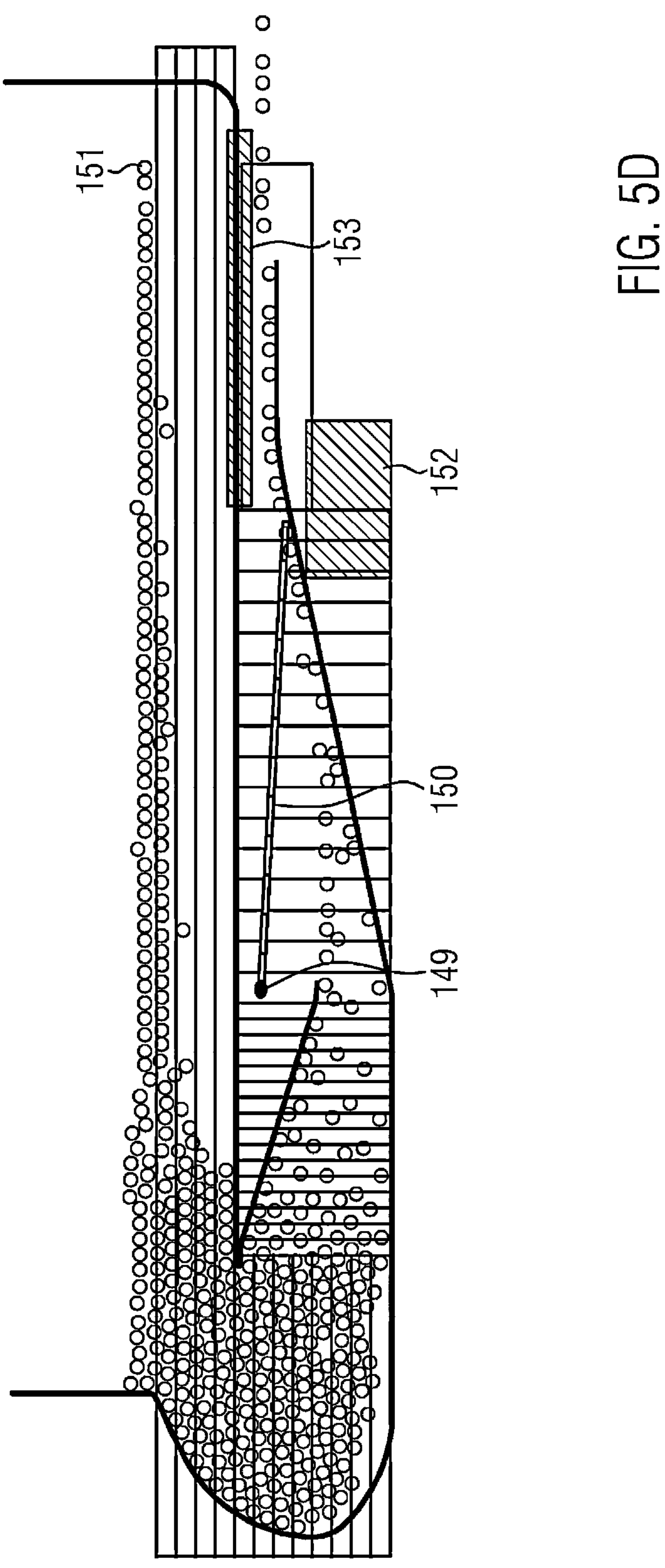
FIG. 5D is a schematic oblique view of the fifth embodiment of the container discharge apparatus from above, with a viewing direction in the first direction.

FIG. 5D shows a schematic plan view of the fifth embodiment of the container discharge apparatus with containers 151 located therein. Due to the transport of containers 151 by means of the first conveyors 123-126 in the first direction 127, the containers 151 jostle at the end of the first conveyors 123-126 and as a result, and due to the concave railing 145, reach the transition region 143 and move towards the second conveyors 129-136, by which they are moved in the second direction 137. The containers 151 arrive at the first intermediate conveyor 138 and are transported due to their inclined arrangement and due to the third railing 144 and the fourth railing 146 to the second intermediate conveyor 139. On the second intermediate conveyor 139, the containers 151 are transported due to the inclined arrangement of the second intermediate conveyor and the fifth railing 147 to the third conveyor 140, which can transport the separated containers 151 away.

Optionally, the container discharge apparatus 121 can comprise a first collecting device 152 below the end of the second intermediate conveyor. In addition, a second collecting device 153 can be provided below the third conveyor 140, towards the first conveyors 123-126.

Figures 6A, 6B:
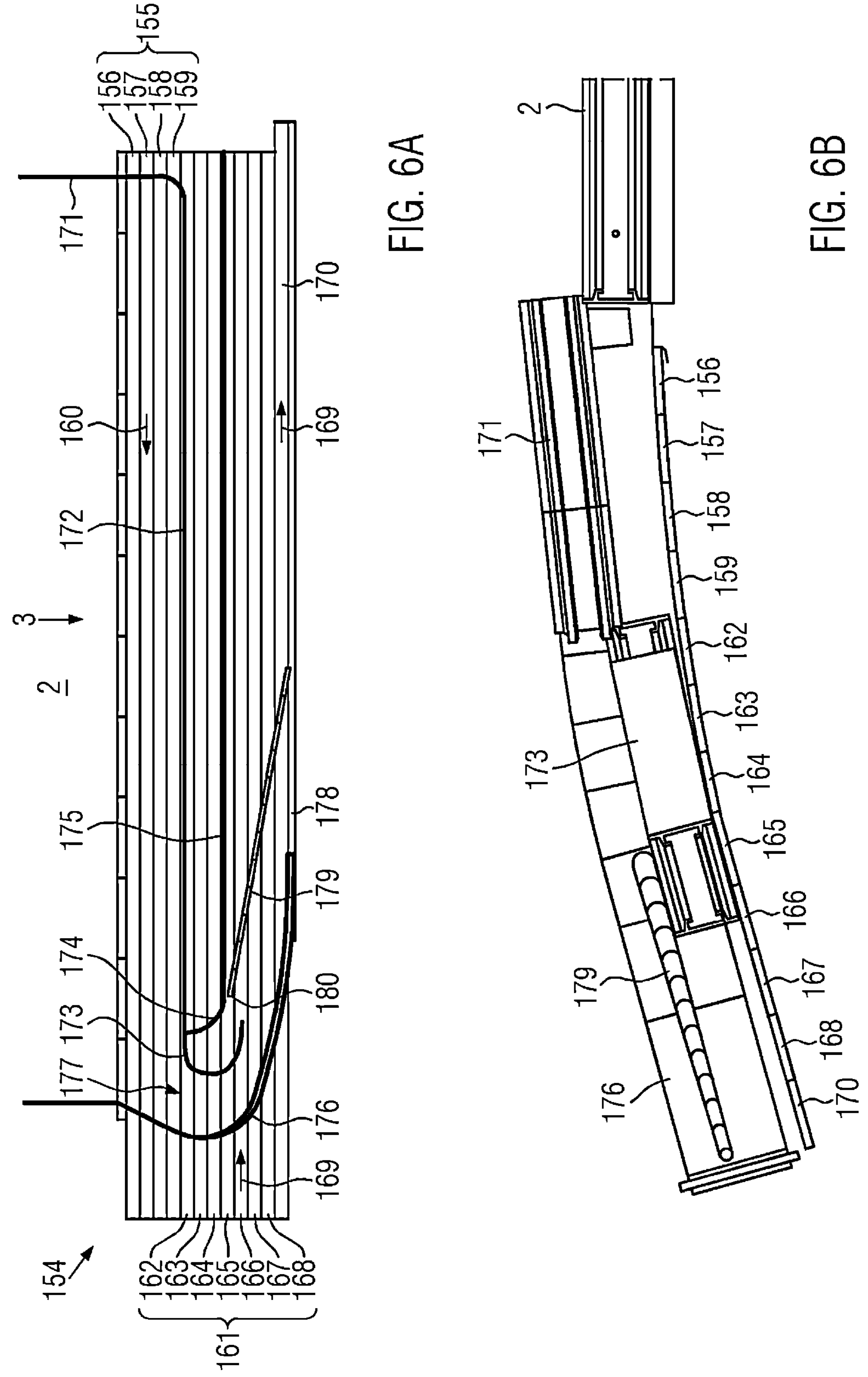
FIG. 6A is a schematic plan view of a sixth embodiment of the container discharge apparatus.
FIG. 6B is a second schematic side view of the sixth embodiment of the container discharge apparatus.

FIG. 6A shows a schematic plan view of a sixth embodiment of the container discharge apparatus 154 for discharging containers from the above-described mass flow conveyor 2 and for separating the containers. The container discharge apparatus 154 comprises, downstream of the mass flow conveyor 2, a first group 155 of, here, four first conveyors 156, 157, 158, 159 arranged in parallel, which can be driven in a first direction 160 transverse to the transport direction 3 of the mass flow conveyor 2. The first conveyors 156-159 are designed such that they can separate containers and convey them in the first direction 160.

Furthermore, the container discharge apparatus 154 comprises, following in parallel the first group 155, a second group 161 of, here, seven second conveyors 162, 163, 164, 165, 166, 167, 168 arranged in parallel and which can be driven in a second direction 169. The second direction 169 is opposite the first direction 160. The second conveyors 162-168 are designed such that they can convey the separated containers in the second direction 169.

In addition, the container discharge apparatus 154 here comprises a third conveyor 170 which is designed such that it can transport the separated containers away in the second direction 169.

At the beginning of the first conveyors 156-159, a first railing 171 is arranged above the transport surfaces of the first conveyors 156-159, the straight portion of which railing extends transversely to the first conveyors 156-159, with a 90° curve following the straight portion.

Above the transport surfaces, a second railing 172 is provided between the first group 155 and the second group 161, which railing is straight and is designed in such a way that a transition region 177 for containers is provided between the first group 155 and the second group 161. The second railing 172 is connected to the first railing 171. Following the second railing 172, above the transport surfaces of the second conveyors 162-166, there is arranged a convex railing 173, which is straight and is designed such that the transition region 177 for containers is provided between the first group 155 and the second group 161.

In addition, a curved railing 174 is arranged above the transport surfaces of the second conveyors 162-165, which railing is connected to the second railing 172. Following the curved railing 174, a third railing 175 is arranged above the transport surfaces of the second conveyor 165. The third railing is straight.

At the end of the first conveyors 156-159 and at the beginning of the second conveyors 162-168, a concave railing 176 is provided above the transport surfaces. Here, the concave railing 176 comprises a curve that describes an angle of 180°. Following the concave railing 176, a fourth railing 178 is provided which runs above and to the side of the third conveyor 170.

In addition, a flexible element 179 is arranged above the transport surfaces of the second conveyors 162-168 and the third conveyor 170, which element is designed to be movable at one end about a pivot point 180.

FIG. 6B shows a second schematic side view of the sixth embodiment of the container discharge apparatus 154, viewed in the first direction 160. In addition to the first railing 171, the convex railing 173, the concave railing 176, and the flexible element 179, the first conveyors 156-159, the second conveyors 162-168, and the third conveyor 170 can be seen.

The transport surfaces of the first conveyors 156-159 are arranged without steps in adjacent regions, and the individual transport surfaces enclose an angle of −15° with a plane perpendicular to the direction of action of gravity.

The transport surface of the first conveyor 159 and the transport surface of the second conveyor 162 are arranged without steps in adjacent regions.

The transport surfaces of the second conveyors 162-168 are arranged without steps in adjacent regions, and the individual transport surfaces enclose an angle of −30° with a plane perpendicular to the direction of action of gravity.

The transport surface of the third conveyor 170 encloses an angle of −30° with a plane perpendicular to the direction of action of gravity. The transport surface of the second conveyor 168 and the transport surface of the third conveyor 170 are arranged without steps in adjacent regions.

Figure 6C:
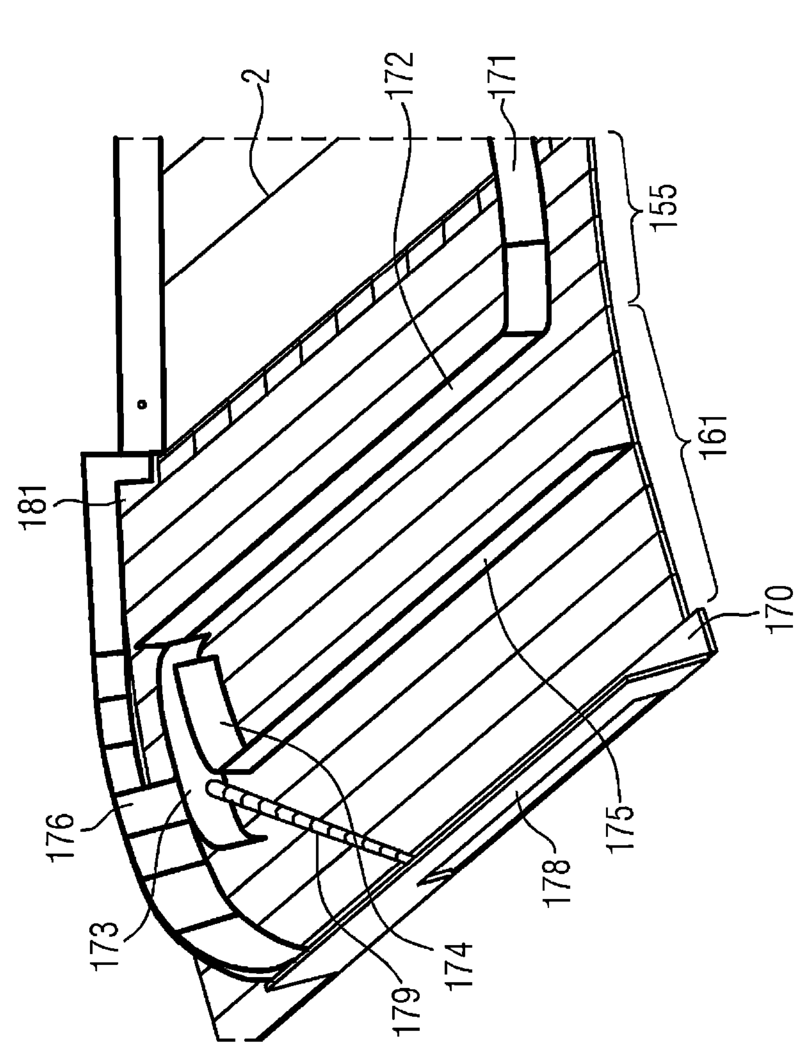
FIG. 6C is a schematic oblique view of the sixth embodiment of the container discharge apparatus from above, with a viewing direction in the first direction.

FIG. 6C shows a schematic oblique view of the sixth embodiment of the container discharge apparatus 154 from above, with a viewing direction in the first direction 160. In addition to the first railing 171, the second railing 172, the convex railing 172, the bent railing 174, the third railing 175, the concave railing 176, and the fourth railing 178, the first conveyors 156-159, the second conveyors 162-168, and the third conveyor 170 can be seen. In addition, an opening 181 of the concave railing 176 is clearly visible, through which for example overturned containers or broken containers can be ejected.

Figure 6D:
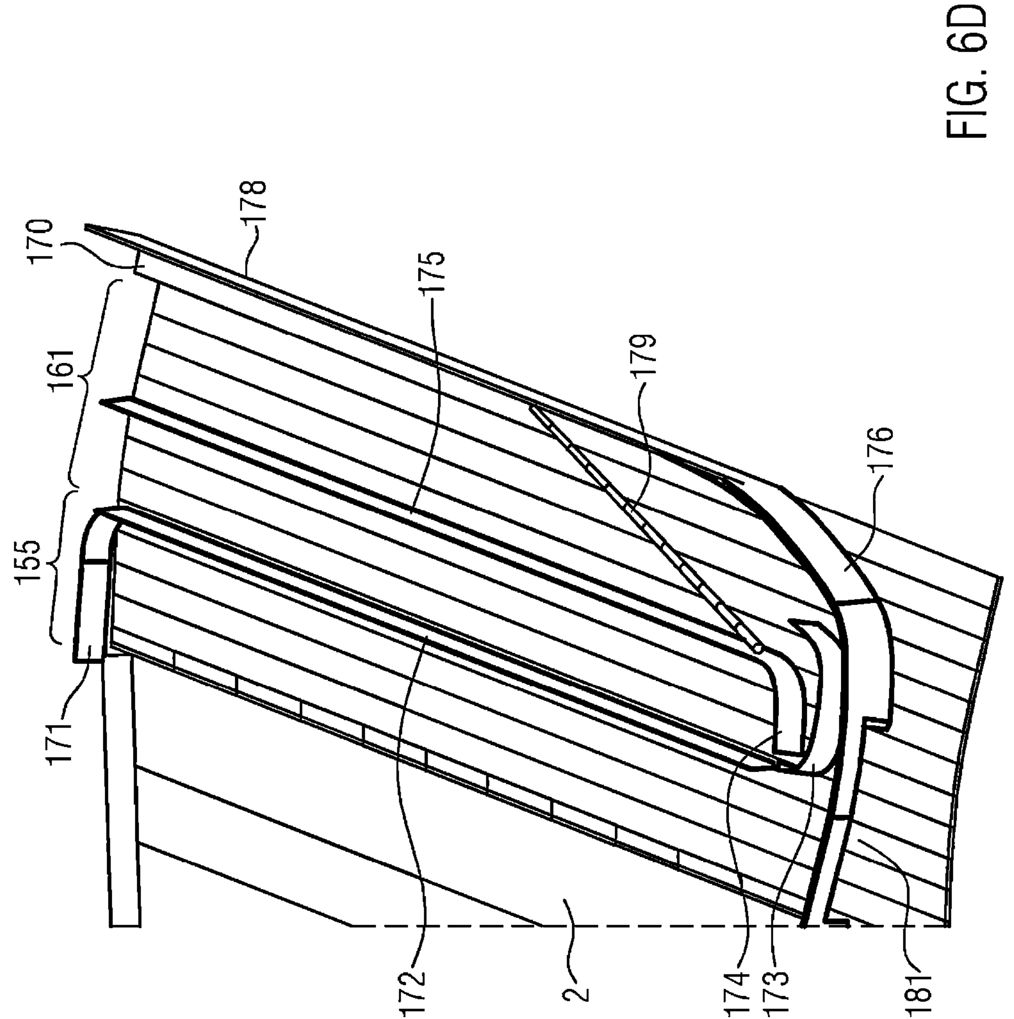
FIG. 6D is a schematic oblique view of the sixth embodiment of the container discharge apparatus from above, with a viewing direction in the first direction.

FIG. 6D shows a schematic oblique view of the sixth embodiment of the container discharge apparatus 154 from above, viewed in the second direction 169. In this representation as well, in addition to the first railing 171, the second railing 172, the convex railing 172, the bent railing 174, the third railing 175, the concave railing 176, and the fourth railing 178, the first conveyors 156-159, the second conveyors 162-168, and the third conveyor 170 can be seen. In addition, the opening 181 of the concave railing 176 is visible, through which for example overturned containers or broken containers can be ejected.

Figure 6E:
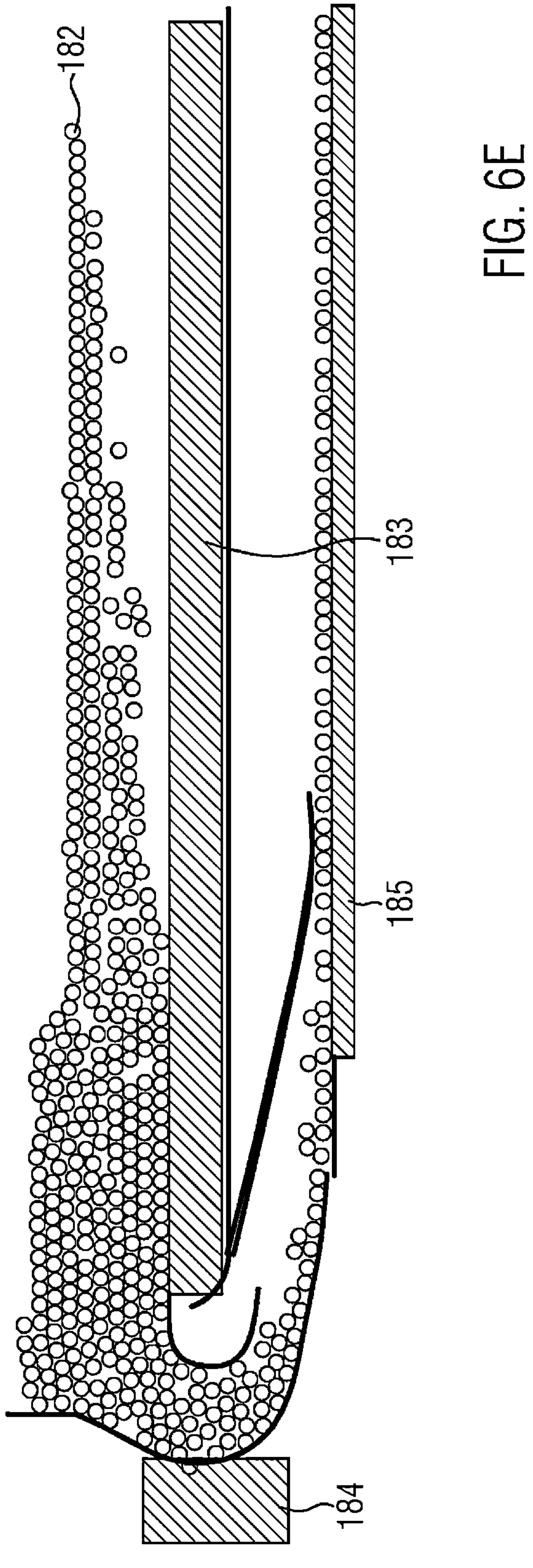
FIG. 6E is a schematic plan view of the sixth embodiment of the container discharge apparatus with containers located therein.

FIG. 6E shows a schematic plan view of the sixth embodiment of the container discharge apparatus 154 with containers 182 located therein. Due to the transport of containers 182 by means of the first conveyors 156-159 in the first direction 160, the containers 182 jostle at the end of the first conveyors 156-159 and as a result, and due to the concave railing 176, reach the transition region 177 and move towards the second conveyors 162-168, by which they are moved in the second direction 169. Due to the convex railing 173, the curved railing 174, the third railing 175, and the fourth railing 178, and the transport in the second direction 169 by the second conveyors 162-168, the containers 182 are transported towards the third conveyor 170, which can transport away the separated containers 182.

Optionally, the container discharge apparatus 154 can comprise a first collecting device 183 which can be arranged below the region between the second railing 172 and the third railing 175. A second collecting device 184 can be arranged partly below the beginning of the second conveyors 162-168. A third collecting device 185 can be arranged partly below and to the side of the third conveyor 170.

The invention claimed is:

1. A container discharge apparatus for discharging containers from a mass flow conveyor and for separating the containers, wherein the container discharge apparatus comprises:

downstream of the mass flow conveyor, a first group of a plurality of first conveyors arranged in parallel, which can be driven in a first direction transverse to a transport direction of the mass flow conveyor and are designed to separate containers and to convey them in the first direction, following in parallel the first group of the plurality of first conveyors arranged in parallel, a second group of a plurality of second conveyors arranged in parallel, which can be driven in a second direction and are designed to convey the separated containers in the second direction, which is opposite the first direction, and one or more third conveyors, wherein the one or more third conveyors are designed to transport the separated containers, wherein, between the second group of the plurality of second conveyors arranged in parallel and the one or more third conveyors, following in parallel the second group of the plurality of second conveyors arranged in parallel, there is provided a further group of a plurality of fourth conveyors arranged in parallel, which can be driven in the first direction and are designed to convey containers in the first direction.

2. The container discharge apparatus according to claim 1, wherein a concave railing is provided at an end of the plurality of first conveyors arranged in parallel and at a beginning of at least some of the plurality of second conveyors arranged in parallel above transport surfaces.

3. The container discharge apparatus according to claim 2, wherein a straight railing is provided above the transport surfaces between the first group and the second group, which railing is designed in such a way that there is a transition region for containers between the first group and the second group.

4. The container discharge apparatus according to claim 3, wherein the transition region is divided by a further concave railing into a first partial transition region and a second partial transition region.

5. The container discharge apparatus according to claim 4, wherein the further concave railing is arranged partially above at least some of the plurality of first conveyors arranged in parallel and at least some of the plurality of second conveyors arranged in parallel.

6. The container discharge apparatus according to claim 4, wherein the further concave railing is also designed to taper in triangular fashion on a surface opposite a concave surface.

7. The container discharge apparatus according to claim 3, wherein a further railing is provided above the transport surfaces of the plurality of second conveyors arranged in parallel.

8. The container discharge apparatus according to claim 7, wherein the further railing leaves the transition region free.

9. The container discharge apparatus according to claim 7, wherein the straight railing merges into the further railing.

10. The container discharge apparatus according to claim 7, wherein the further railing is straight or comprises steps.

11. The container discharge apparatus according to claim 2, wherein the concave railing comprises a curve that describes an angle in an angular range of 135° to 195°.

12. The container discharge apparatus according to claim 1, wherein the plurality of first conveyors arranged in parallel each comprise individual transport surfaces which are arranged without steps in adjacent regions, wherein the individual transport surfaces enclose angles of 0° to −30°, inclusive, with a plane perpendicular to a direction of action of gravity.

13. The container discharge apparatus according to claim 12, wherein the plurality of second conveyors arranged in parallel each comprise transport surfaces which are arranged without steps in adjacent regions, wherein the individual transport surfaces enclose angles of 0° to −30°, inclusive, with the plane perpendicular to the direction of action of gravity.

14. The container discharge apparatus according to claim 12, wherein the plurality of second conveyors arranged in parallel each comprise transport surfaces which are arranged without steps in adjacent regions, wherein the individual transport surfaces enclose angles of 0° to +30°, inclusive, with the plane perpendicular to the direction of action of gravity.

15. The container discharge apparatus according to claim 1, wherein a first number of the plurality of second conveyors arranged in parallel each comprise individual first transport surfaces which are arranged without steps in adjacent regions, wherein the individual first transport surfaces enclose angles of 0° to −30°, inclusive, with a plane perpendicular to a direction of action of gravity, and wherein a second number of the plurality of second conveyors arranged in parallel each comprise individual second transport surfaces, which are arranged without steps in adjacent regions, wherein the individual second transport surfaces enclose angles of 0° to +30°, inclusive, with a plane perpendicular to the direction of action of gravity.

16. The container discharge apparatus according to claim 15, wherein at least one of the plurality of second conveyors arranged in parallel is provided with its transport surface between the first number and the second number of the plurality of second conveyors arranged in parallel, and its transport surface encloses an angle of 0° with a plane perpendicular to the direction of action of gravity.

17. The container discharge apparatus according to claim 1, wherein the container discharge apparatus comprises at least one ejection device for containers.

18. The container discharge apparatus according to claim 17, wherein the at least one ejection device for containers that comprises at least one flexible element and at least one collecting device for ejected containers, wherein the at least one flexible element is provided spaced above at least some of the plurality of first conveyors arranged in parallel and/or above at least some of the plurality of second conveyors arranged in parallel, wherein the at least one collecting device is provided below at least some of the plurality of first conveyors arranged in parallel and/or below at least some of the plurality of second conveyors arranged in parallel, wherein the at least one flexible element is designed to be adjustable in height.

19. The container discharge apparatus according to claim 1, wherein a number of the third conveyors is smaller or larger than a number of the second conveyors, or wherein the number of the third conveyors is equal to the number of the second conveyors.

20. A method for operating the container discharge apparatus according to claim 1.

* * * * *